US012707336B2

(12) United States Patent
Ke

(10) Patent No.: US 12,707,336 B2
(45) Date of Patent: Aug. 11, 2026

(54) QUALITY OF SERVICE (QoS) CONTROL METHOD AND APPARATUS MEETING QoS REQUIREMENTS OF SAME SERVICE IN DIFFERENT TIME PERIODS

(71) Applicant: VIVO MOBILE COMMUNICATION CO., LTD., Dongguan (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 318 days.

(21) Appl. No.: 18/534,552

(22) Filed: Dec. 8, 2023

(65) Prior Publication Data

US 2024/0107380 A1 Mar. 28, 2024

Related U.S. Application Data

(63) Continuation of application No. PCT/CN2022/097327, filed on Jun. 7, 2022.

(30) Foreign Application Priority Data

Jun. 10, 2021 (CN) ......................... 202110650077.3

(51) Int. Cl.
*H04W 28/16* (2009.01)

(52) U.S. Cl.
CPC .................................. *H04W 28/16* (2013.01)

(58) Field of Classification Search
CPC ..... H04W 28/16; H04W 28/02; H04W 28/24; H04W 28/0268; H04W 28/0205; H04W 8/04; H04L 47/24; H04L 47/805
See application file for complete search history.

(56) References Cited

U.S. PATENT DOCUMENTS

2007/0121542 A1* 5/2007 Lohr .................. H04L 47/2425 370/395.21
2014/0082645 A1* 3/2014 Stern ................ H04N 21/26258 725/23

(Continued)

FOREIGN PATENT DOCUMENTS

CN 103404096 A 11/2013
CN 106465194 A 2/2017

(Continued)

OTHER PUBLICATIONS

Extended European Search Report issued in related European Application No. 22819508.7, mailed Sep. 4, 2024, 9 pages.

(Continued)

*Primary Examiner* — Mewale A Ambaye
(74) *Attorney, Agent, or Firm* — IPX PLLC

(57) ABSTRACT

This application discloses a QoS control method and apparatus. The QoS control method includes: obtaining, by a first communication device, first information or index information used to indicate a value of the first information, where the first information includes at least one of the following: description information of a data tunnel; data description information of first data; information about a first time period; QoS configuration information; first indication information; or second indication information; and performing, by the first communication device, a QoS control operation on data in the data tunnel according to the first information, where the QoS configuration information includes at least one of the following: first QoS configuration information and second QoS configuration information, the second QoS configuration information, or QoS configuration adjustment information; the first indication information is used to indicate activating the first QoS configuration information or deactivating the first QoS configuration information.

20 Claims, 6 Drawing Sheets

(56) References Cited

U.S. PATENT DOCUMENTS

| | | | | |
|---|---|---|---|---|
| 2015/0029854 | A1* | 1/2015 | Starsinic | H04W 4/70 370/235 |
| 2016/0294910 | A1 | 10/2016 | Li et al. | |
| 2018/0139030 | A1* | 5/2018 | Kim | H04L 5/0053 |
| 2019/0364457 | A1 | 11/2019 | Szilagyi et al. | |
| 2024/0430209 | A1* | 12/2024 | Ke | H04L 47/283 |
| 2025/0358691 | A1* | 11/2025 | Wang | H04W 36/0064 |

FOREIGN PATENT DOCUMENTS

| | | | | |
|---|---|---|---|---|
| CN | 107005893 | A | 8/2017 | |
| CN | 107734562 | A | 2/2018 | |
| WO | WO-2015192295 | A1 * | 12/2015 | H04W 28/24 |
| WO | WO-2018145103 | A1 * | 8/2018 | H04W 28/0205 |

OTHER PUBLICATIONS

First Office Action issued in related Chinese Application No. 202110650077.3, mailed Jun. 14, 2024, 18 pages.

International Search Report issued in corresponding International Application No. PCT/CN2022/097327, mailed Sep. 14, 2022, 4 pages.

* cited by examiner

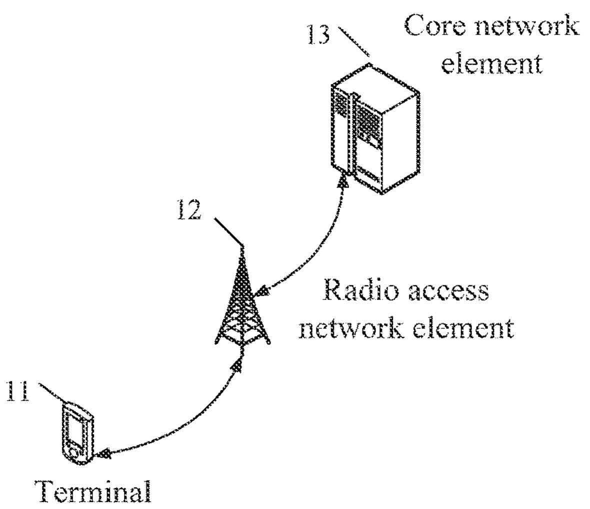
FIG. 1
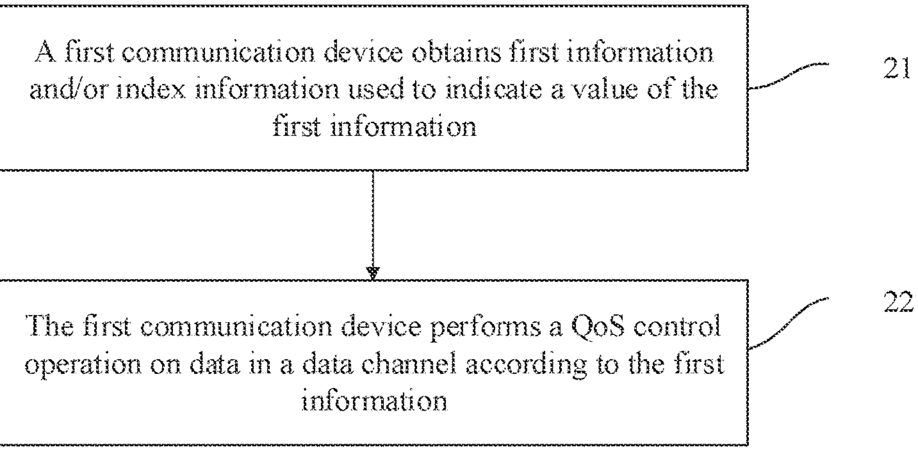
FIG. 2
A second communication device sends request information
31
FIG. 3

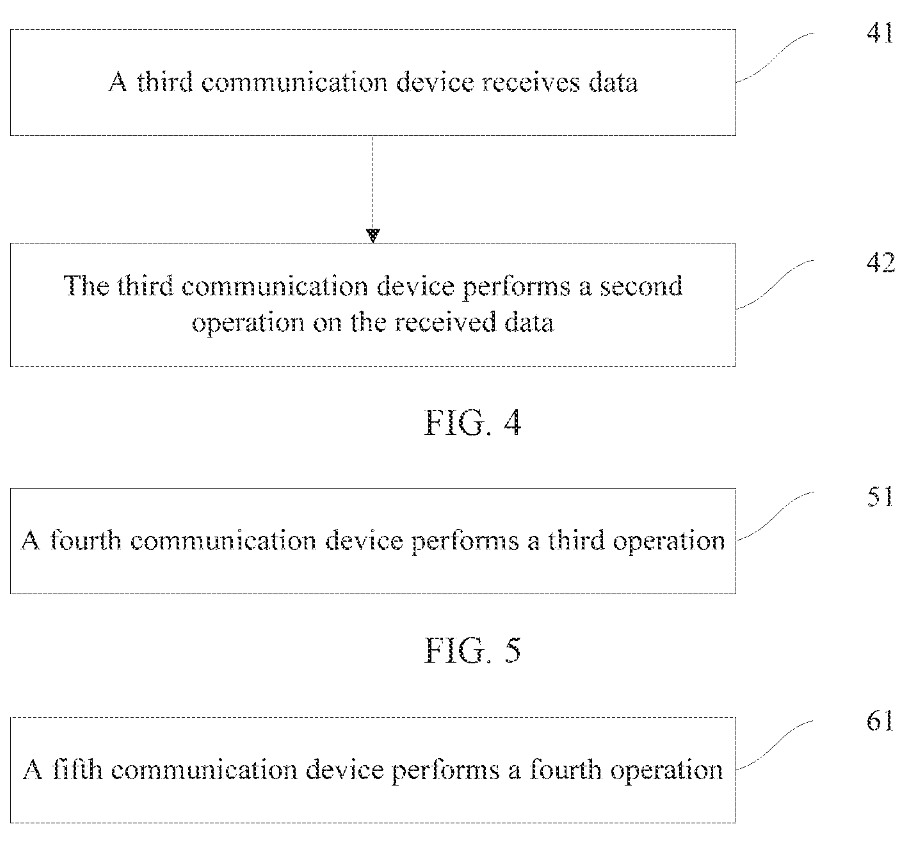
FIG. 4
FIG. 5
FIG. 6
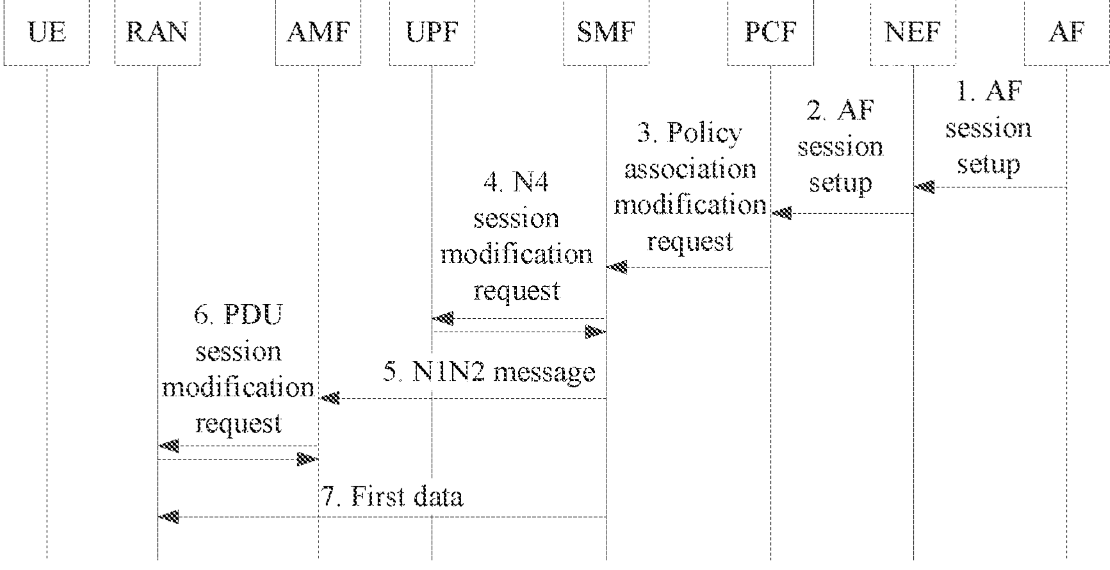
FIG. 7

130
Communication device
131
Processor
Memory
132

QUALITY OF SERVICE (QoS) CONTROL METHOD AND APPARATUS MEETING QoS REQUIREMENTS OF SAME SERVICE IN DIFFERENT TIME PERIODS

CROSS-REFERENCE TO RELATED APPLICATIONS

This application is a continuation of International Application No. PCT/CN2022/097327, filed Jun. 7, 2022, which claims priority to Chinese Patent Application No. 202110650077.3, filed Jun. 10, 2021. The entire contents of each of the above-referenced applications are expressly incorporated herein by reference.

TECHNICAL FIELD

This application relates to the field of wireless communication technologies, and specifically relates to a QoS control method and apparatus.

BACKGROUND

In a process of downloading a data service, for example, a playback service of a video, a download rate of originally downloaded first data (for example, the first few minutes of the video) needs to be greater than a download rate of subsequently downloaded data because a user is waiting in the process of downloading the first data, and user experience can be improved only through fast downloading. In the subsequent data downloading process, the user is still watching cached data that has been downloaded, and service experience of the user is not affected as long as the download does not affect a viewing progress. However, in a process in which the user watches the video, the user may perform an operation such as dragging a progress or changing a perspective on the video, and therefore video viewing experience returns to a state of the first data. In this case, a data download rate needs to be improved.

In other words, Quality of Service (QoS) requirements of a same service in different time periods are different, and how to meet QoS requirements of a same service in different time periods is an urgent problem to be resolved.

SUMMARY

Embodiments of this application provide a QoS control method and apparatus.

According to a first aspect, a QoS control method is provided, including:

obtaining, by a first communication device, first information and/or index information used to indicate a value of the first information, where the first information includes at least one of the following: description information of a data tunnel; data description information of first data; information about a first time period; QoS configuration information; first indication information; or second indication information; and performing, by the first communication device, a QoS control operation on data in the data tunnel according to the first information, where the QoS configuration information includes at least one of the following: first QoS configuration information and second QoS configuration information, the second QoS configuration information, or QoS configuration adjustment information; the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel.

According to a second aspect, a QoS control method is provided, including:

sending, by a second communication device, request information, where the request information includes at least one of the following:

data characteristic information of first data;

information about a first time period;

requested QoS configuration information;

first indication information; or second indication information, where the QoS configuration information includes at least one of the following: first QoS configuration information and second QoS configuration information, the second QoS configuration information, or QoS configuration adjustment information; the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel.

According to a third aspect, a QoS control method is provided, including:

receiving, by a third communication device, data; and performing, by the third communication device, a second operation on the received data, where the second operation includes at least one of the following:

identifying that the received data is first data or is not first data;

adding. to a first header of the first data, target information that conforms to data characteristic information of the first data; or sending processed first data, where the target information includes at least one of the following: first information or index information used to indicate a value of the first information; and the first information includes at least one of the following: description information of a data tunnel; data description information of the first data; information about a first time period; QoS configuration information; first indication information; or second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel.

According to a fourth aspect, a QoS control method is provided, including:

performing, by a fourth communication device, a third operation, where the third operation includes at least one of the following:

determining first information;

sending a first data operation rule or sending a first data operation rule and an effective time period of the first data operation rule; or sending the first information and/or index information used to indicate a value of the first information, where the first information includes at least one of the following: description information of a data tunnel; data description information of first data; information about a first time period; QoS configuration information; first indication information; or second indication information, where the QoS configuration information includes at least one of the following: first QoS configuration information and second QoS configuration information, the second QoS configuration information, or QoS configuration adjustment information; the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel; and the first data operation rule includes at least one of the following:

data characteristic information of the first data;

target information corresponding to the first data; or operation information used to instruct to add the target information to data that conforms to the data characteristic information of the first data.

According to a fifth aspect, a QoS control method is provided, including:

performing, by a fifth communication device, a fourth operation, where the fourth operation includes at least one of the following:

a related operation of determining a first time period;

determining first policy information;

determining an effective time period of the first policy information; or sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; or first information corresponding to the first data, where the target information includes at least one of the following: the first information, or index information used to indicate a value of the first information; and the first information includes at least one of the following: description information of a data tunnel; data description information of the first data; information about a first time period; QoS configuration information; first indication information; or second indication information, where the QoS configuration information includes at least one of the following: first QoS configuration information and second QoS configuration information, the second QoS configuration information, or QoS configuration adjustment information; the first indication information is used to indicate one of the following: activating the first QoS configuration information, or deactivating the first QoS configuration information, and the second indication information is used to indicate one of the following: improving a QoS configuration of a data tunnel, or restoring a QoS configuration of a data tunnel.

According to a sixth aspect, a QoS control apparatus is provided, including:

an obtaining module, configured to obtain first information and/or index information used to indicate a value of the first information, where the first information includes at least one of the following: description information of a data tunnel; data description information of first data; information about a first time period; QoS configuration information; first indication information; or second indication information; and an execution module, configured to perform a QoS control operation on data in the data tunnel according to the first information, where the QoS configuration information includes at least one of the following: first QoS configuration information and second QoS configuration information, the second QoS configuration information, or QoS configuration adjustment information; the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel.

According to a seventh aspect, a QoS control apparatus is provided, including:

a sending module, configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

According to an eighth aspect, a QoS control apparatus is provided, including:

a receiving module, configured to receive data; and an execution module, configured to perform a second operation on the received data, where the second operation includes at least one of the following:

identifying that the received data is first data or is not first data;

adding, to a first header of the first data, target information that conforms to data characteristic information of the first data; and sending processed first data, where the target information includes at least one of the following: first information and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

According to a ninth aspect, a QoS control apparatus is provided, including:

an execution module, configured to perform a third operation, where the third operation includes at least one of the following:

determining first information;

sending a first data operation rule or sending a first data operation rule and an effective time period of the first data operation rule; and sending the first information and/or index information used to indicate a value of the first information, where the first information includes at least one of the following: description information of a data tunnel; data description information of first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel; and the first data operation rule includes at least one of the following:

data characteristic information of the first data;

target information corresponding to the first data; and operation information used to instruct to add the target information to data that conforms to the data characteristic information of the first data.

According to a tenth aspect, a QoS control apparatus is provided, including:

an execution module, configured to perform a fourth operation, where the fourth operation includes at least one of the following:

a related operation of determining a first time period;

determining first policy information;

determining an effective time period of the first policy information; and sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; and first information corresponding to the first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information, and the second indication information is used to indicate one of the following: improving a QoS configuration of a data tunnel, and restoring a QoS configuration of a data tunnel.

According to an eleventh aspect, a communication device is provided, including a processor, a memory, and a program or an instruction that is stored in the memory and that can be run on the processor, and the program or the instruction is executed by the processor to implement the steps of the method in the first aspect, the second aspect, the third aspect, the fourth aspect, or the fifth aspect.

According to a twelfth aspect, a communication device is provided, including a processor and a communication interface, where the processor is configured to: obtain first information and/or index information used to indicate a value of the first information, where the first information includes at least one of the following: description information of a data tunnel; data description information of first data; information about a first time period; QoS configuration information; first indication information; and second indication information; and perform a QoS control operation on data in the data tunnel according to the first information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

According to a thirteenth aspect, a communication device is provided, including a processor and a communication interface, where the communication interface is configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

According to a fourteenth aspect, a communication device is provided, including a processor and a communication interface, where the communication interface is configured to receive data; and the processor is configured to perform a second operation on the received data, where the second operation includes at least one of the following:

identifying that the received data is first data or is not first data;

adding, to a first header of the first data, target information that conforms to data characteristic information of the first data; and sending processed first data, where the target information includes at least one of the following: first information and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

According to a fifteenth aspect, a communication device is provided, including a processor and a communication interface, where the processor is configured to perform a third operation, where the third operation includes at least one of the following:

determining first information;

sending a first data operation rule or sending a first data operation rule and an effective time period of the first data operation rule; and sending the first information and/or index information used to indicate a value of the first information, where the first information includes at least one of the following: description information of a data tunnel; data description information of first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel; and the first data operation rule includes at least one of the following:

data characteristic information of the first data;

target information corresponding to the first data; and operation information used to instruct to add the target information to data that conforms to the data characteristic information of the first data.

According to a sixteenth aspect, a communication device is provided, including a processor and a communication interface, where the processor is configured to perform a fourth operation, where the fourth operation includes at least one of the following:

a related operation of determining a first time period;

determining first policy information;

determining an effective time period of the first policy information; and sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; and first information corresponding to the first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information, and the second indication information is used to indicate one of the following: improving a QoS configuration of a data tunnel, and restoring a QoS configuration of a data tunnel.

According to a seventeenth aspect, a readable storage medium is provided, where the readable storage medium stores a program or an instruction, and the program or the instruction is executed by a processor to implement the steps of the method in the first aspect, the second aspect, the third aspect, the fourth aspect, or the fifth aspect.

According to an eighteenth aspect, a chip is provided, where the chip includes a processor and a communication interface, the communication interface is coupled to the processor, and the processor is configured to run a program or an instruction to implement the method in the first aspect, the second aspect, the third aspect, the fourth aspect, or the fifth aspect.

According to a nineteenth aspect, a computer program/program product is provided, where the computer program/program product is stored in a non-volatile storage medium, and the program/program product is executed by at least one processor to implement the steps of the method in the first aspect, the second aspect, the third aspect, the fourth aspect, or the fifth aspect.

In the embodiments of this application, a first communication device can activate or deactivate first QoS configuration information or improve or restore a QoS configuration of a data tunnel by using first information. In addition, first data and/or a time period of a service can be identified by using the first information, that is, identify data and/or a time period for which QoS needs to be improved, thereby resolving different QoS requirements of a same service in different time periods and improving user experience.

BRIEF DESCRIPTION OF DRAWINGS

FIG. 1 is a block diagram of a wireless communication system to which embodiments of this application are applicable;

FIG. 2 is a first flowchart of a QoS control method according to an embodiment of this application;

FIG. 3 is a second flowchart of a QoS control method according to an embodiment of this application;

FIG. 4 is a third flowchart of a QoS control method according to an embodiment of this application;

FIG. 5 is a fourth flowchart of a QoS control method according to an embodiment of this application;

FIG. 6 is a fifth flowchart of a QoS control method according to an embodiment of this application;

FIG. 7 is a sixth flowchart of a QoS control method according to an embodiment of this application;

DETAILED DESCRIPTION

Figure 8:
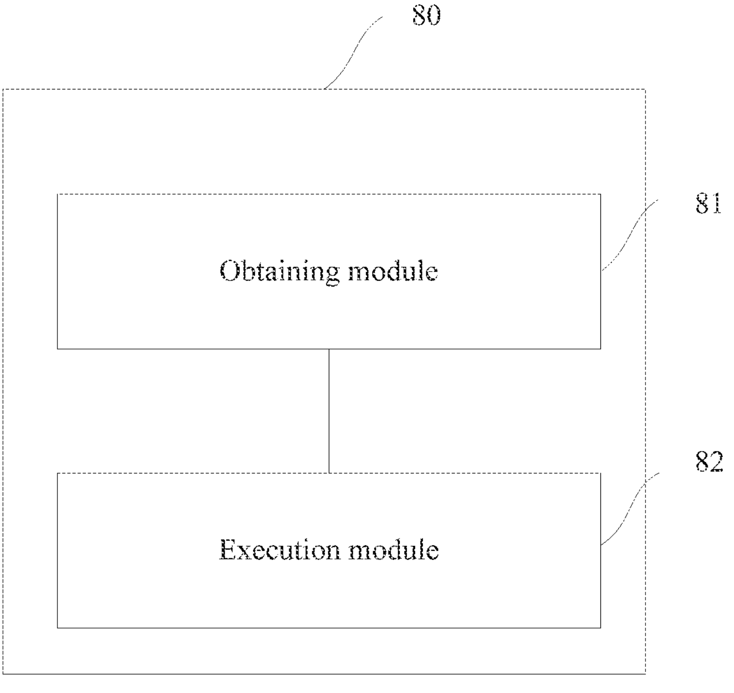
FIG. 8 is a first schematic structural diagram of a QoS control apparatus according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of this application, the word such as "example" or "for example" is used to represent giving an example, an illustration, or a description. Any embodiment or design scheme described as "an example of" or "for example" in the embodiments of this application should not be explained as being more preferred or having more advantages than another embodiment or design scheme. Exactly, use of the term "example" or "for example" is intended to present a concept in a specific manner.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of this application, obtaining may be understood as generating, obtaining from a configuration, receiving, receiving through a request, obtaining through self-learning, deriving from unreceived information, or obtaining after processing based on received information. This may be determined based on an actual requirement, and is not limited in the embodiments of this application.

In the embodiments of this application, sending may include broadcasting, broadcasting in a system message, returning after responding to a request, sending by using dedicated signaling, and the like.

In the embodiments of this application, the network includes a mobile communication network.

The method and the communication device provided in the embodiments of this application may be applied to a wireless communication system. The wireless communication system may be a Fifth-generation (5G) system, an Evolved Packet System (EPS), or a subsequent evolved communication system. The wireless communication network in the embodiments of this application may be a fifth-generation mobile communication network (Fifth-generation system, 5GS) or an LTE network.

In the specification and claims of this application, the terms "first", "second", and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects. In some implementations, objects indicated by "first" and "second" may be the same or different.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a New Radio (NR) system for example purposes, and NR terms are used in most of the following descriptions, but these technologies can also be applied to an application other than an NR system application, for example, a 6th Generation (6G) communication system.

The embodiments of this application are described below with reference to the accompanying drawings. An information transmission method and apparatus, a communication device, and a storage medium provided in the embodiments of this application may be applied to the network system shown in FIG. 1. As shown in FIG. 1, the network system includes a terminal 11, a radio access network element 12, and a core network element 13.

In an embodiment of this application, a communication device may include at least one of the following: a communication network element device or a terminal.

In an embodiment of this application, a communication network element may include at least one of the following: a core network element or a radio access network element.

In the embodiments of this application, the core network element 13 may be referred to as at least one of the following: a core network device, a core network node, a core network function, or a core network unit. The core network element includes but is not limited to at least one of the following: a Mobility Management Entity (MME), an Access Management Function (AMF), a Session Management Function (SMF), a User Plane Function (UPF), a serving gateway (serving GW, SGW), a PDN gateway, a Policy Control Function (PCF), a Policy and Charging Rules Function (PCRF), a Serving GPRS Support Node (SGSN), a Gateway GPRS Support Node (GGSN), a Unified Data Management (UDM), a Unified Data Repository (UDR), a Home Subscriber Server (HSS), an Application Function (AF), or a Centralized network configuration (CNC).

In the embodiments of this application, the radio access network element 12 may be referred to as at least one of the following: a radio access network device, a radio access network node, a radio access network function, or a radio access network unit. The radio access network element may include but is not limited to at least one of the following: a Third Generation Partnership Project (3GPP) radio access network, a non-3GPP radio access network, a Centralized Unit (CU), a Distributed Unit (DU), a base station, an evolved NodeB (eNB), a 5G base station (gNB), a Radio Network Controller (RNC), a base station (NodeB), a Non-3GPP Inter Working Function (N3IWF), an Access Controller (AC) node, an Access Point (AP) device, a Wireless Local Area Networks (WLAN) node, or an N3IWF.

The base station may be a base transceiver station (BTS) in a Global System for Mobile Communication (GSM) or Code Division Multiple Access (CDMA), or may be a NodeB in Wideband Code Division Multiple Access (WCDMA), or may be an evolved NodeB (eNB or e-NodeB) and a 5G base station (gNB) in LTE. This is not limited in the embodiments of this application.

In the embodiments of this application, UE is a terminal. The terminal 11 may include a relay that supports a function of the terminal and/or a terminal that supports a function of the relay. The terminal may also be referred to as a terminal device to User Equipment (UE). The terminal may be a terminal side device such as a mobile phone, a tablet personal computer, a laptop computer, a personal digital assistant (PDA), a mobile internet device (MID), an augmented reality (AR)/virtual reality (VR) device, a robot, a wearable device (Wearable Device), or an in-vehicle device. It should be noted that a specific type of the terminal is not limited in the embodiments of this application.

The terminal 11 may also be referred to as a terminal device or UE. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smartwatch, a bracelet, a headset, glasses, and the like. It should be noted that a specific type of the terminal 11 is not limited in the embodiments of this application. The radio access network element 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Networks (WLAN) access point, a Wireless Fidelity (Wi-Fi) node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

In addition, the embodiments of this application may be applied to communication systems such as 4G, 5G, and 6G.

In a process of downloading a data service, for example, a playback service of a video, a download rate of originally downloaded first data (for example, the first few minutes of the video) needs to be greater than a download rate of subsequently downloaded data because a user is waiting in the process of downloading the first data, and user experience can be improved only through fast downloading. In the subsequent data downloading process, the user is still watching cached data that has been downloaded, and service experience of the user is not affected as long as the download does not affect a viewing progress. However, in a process in which the user watches the video, the user may perform an operation such as dragging a progress or changing a perspective on the video, and therefore video viewing experience returns to a state of the first data. In this case, a data download rate needs to be improved.

In other words, Quality of Service (QoS) requirements of a same service in different time periods are different, and how to meet QoS requirements of a same service in different time periods is an urgent problem.

Technical problems to be resolved in the embodiments of this application are as follows:

Problem 1: QoS requirements of a same service in different time periods.

Problem 2: How to identify a time period of a service or identify first data.

Solutions of this application include at least one of the following:

Solution 1: A Core Network (CN) provides at least one of the following for a Radio Access Network (RAN): description information of a data tunnel; data description information of first data; information about a first time period; QoS configuration information; first indication information that is used to indicate one of the following; activating first QoS configuration information, or deactivating the first QoS configuration information; and second indication information that is used to indicate one of the following: improving a QoS configuration of a data tunnel, or restoring a QoS configuration of a data tunnel.

The QoS configuration information includes two groups of QoS configuration information (first QoS configuration information and second QoS configuration information) corresponding to one QoS flow.

The first QoS configuration information is used for the first data or data of the first time period; the first data is one or more data packets of an initial burst; and the first time period is a time period of the initial burst. The second QoS configuration information is used for other data except the first data, and a second QoS profile is default effective QoS configuration information of a QoS flow. The initial burst is, for example, one of the following: a service start, or a state caused by a user moving progress bar or a change angle.

Solution 2: A CN provides at least one of the following for a RAN: description information of a data tunnel; data description information of first data; information about a first time period; one group of QoS configuration information; first indication information that is used to indicate one of the following: activating first QoS configuration information, or deactivating the first QoS configuration information; and second indication information that is used to indicate one of the following: improving a QoS configuration of a data tunnel, or restoring a QoS configuration of a data tunnel.

That is, one QoS flow is still one group of QoS configuration information.

However, according to a policy, the RAN may improve a transmission priority and/or a transmission rate of the first data, or improve a transmission priority and/or a transmission rate of data whose timestamp conforms to the first time period.

Solution 3: Two QoS flows are established for a service to meet different QoS requirements in different time periods.

The following describes the communication terms in the embodiments of this application.

In an embodiment of the present application, data and a data packet represent a same meaning and may be interchanged.

In an embodiment of this application, QoS configuration information (for example, a QoS profile) includes: an aggregated maximum bit rate (for example, an aggregated maximum bit rate of a PDU session), QoS level indication information, priority information, a data delay budget, a data bit error rate, a maximum data burst size, a Guaranteed Bit Rate (GBR), a default average window requirement, a default average window, and GBR-related QoS parameter information.

In an embodiment of the present application, the GBR-related QoS parameter information may include at least one of the following: a downlink maximum bit rate, an uplink maximum bit rate, a downlink guaranteed bit rate, an uplink guaranteed bit rate, a downlink maximum packet loss rate, an uplink maximum packet loss rate, notification control, or an alternate QoS parameter set list.

In an embodiment of the present application, the alternate QoS parameter set list includes one or more alternate QoS parameter sets. One alternate QoS parameter set includes at least one of the following: an alternate QoS set index, a downlink guaranteed bit rate, an uplink guaranteed bit rate, a data delay budget, or a data bit error rate.

In an embodiment of the present application, the second QoS configuration information is default QoS configuration information of the data tunnel.

In an embodiment of the present application, the first QoS configuration information has a higher QoS parameter requirement than the second QoS configuration information, for example, at least one of the following: a larger maximum bit rate, a larger guaranteed bit rate, a larger maximum data burst size, a smaller data delay budget, or a smaller data bit error rate.

In an embodiment of this application, the improving a QoS configuration of a data tunnel includes at least one of the following: a higher priority, a smaller data delay budget, a lower data bit error rate, a larger maximum data burst size, or higher GBR-related QoS parameter information.

In an implementation, the higher GBR-related QoS parameter information may include at least one of the following: a higher downlink maximum bit rate, a higher uplink maximum bit rate, a higher downlink guaranteed bit rate, a higher uplink guaranteed bit rate, a lower downlink maximum packet loss rate, or a lower uplink maximum packet loss rate.

In an embodiment of this application. QoS configuration adjustment information includes at least one of the following: index information used to instruct to adjust a QoS configuration value, an adjusted aggregated maximum bit rate (for example, a larger aggregated maximum bit rate), an adjusted priority (for example, a higher priority), an adjusted data delay budget (for example, a smaller data delay budget), an adjusted data bit error rate (for example, a lower data bit error rate), an adjusted maximum data burst size (for example, a larger maximum data burst size), or adjusted GBR-related QoS parameter information (for example, higher GBR-related QoS parameter information).

In an embodiment of this application, the adjusted GBR-related QoS parameter information may include at least one of the following: a higher downlink maximum bit rate, an adjusted uplink maximum bit rate (for example, a higher uplink maximum bit rate), an adjusted downlink guaranteed bit rate (for example, a higher downlink guaranteed bit rate), an adjusted uplink guaranteed bit rate (for example, a higher uplink guaranteed bit rate), an adjusted downlink maximum packet loss rate (for example, a lower downlink maximum packet loss rate), or an adjusted uplink maximum packet loss rate (for example, a lower uplink maximum packet loss rate).

In an embodiment of the present application, description information of a data tunnel includes information used to identify the data tunnel. When the data tunnel is a QoS flow, the description information of the data tunnel may be at least one of the following: a QoS flow identifier or a 5QI.

In an embodiment of this application, a data tunnel may include but is not limited to one of the following: a Protocol Data Unit (PDU) session, a PDN connection, a QoS flow, a bearer, an Internet Protocol security (IPsec) tunnel, where the bearer may be an Evolved Radio Access Bearer (E-RAB), a Radio Access Bearer (RAB), a Data Radio Bearer (DRB), a signaling radio bearer (SRB), or the like.

In an embodiment of this application, a first header is a header of a first protocol.

In an embodiment of this application, the first protocol is an interface protocol between a first communication device and a third communication device.

In an implementation, in a case that the first communication device is a RAN network element and the third communication device is a gateway, the interface protocol between the first communication device and the third communication device may be an interface protocol between the RAN network element and the gateway, for example, an interface protocol of an NG interface user plane, namely, a GTP-U, and the header of the first protocol may be a GTP-U container.

In an implementation, in a case that the first communication device is a RAN network element and the third communication device is a terminal, the interface protocol between the first communication device and the third communication device may be an interface protocol between the RAN network element and the terminal, for example, Radio Resource Control (RRC).

In an embodiment of this application, a data set includes a data frame. In another embodiment of this application, a data set includes one or more data packets. Data frames correspond to data sets one by one or a plurality of data frames are mapped to one data set.

In an implementation, the data frame includes a data frame of a video service. For example, a type of the data frame is one of the following: an I frame, a P frame, a B frame, a left-eye frame, or a right-eye frame.

In an embodiment of this application, type information of a data packet, type information of data, or type information of a data set includes at least one of the following: an I frame, a non-I frame, a left-eye frame, a right-eye frame, a first type, or another type dependent on the first type. In an implementation, the first type may be referred to as a key type.

In an embodiment of this application, a data frame may include one or more data packets having same content or one or more consecutive data packets, for example, an I frame, a non-I frame, a P frame, a B frame, a left-eye frame, and a right-eye frame.

In an implementation, the non-I frame includes at least one of the following: a P frame or a B frame.

In an embodiment of this application, an importance level may include one or more importance levels. Importance level information includes at least one of the following: being equal, or information used to identify the importance level.

In an implementation, the information used to identify the importance level includes an importance level sequence number (for example, an $N^{th}$ importance level). In an implementation, a larger importance level sequence number indicates a higher importance level. In another implementation, a smaller importance level sequence number indicates a lower importance level.

In an implementation, the importance level is referred to as a priority level.

In an implementation of the present application, a data set that is associated with a first data set includes a data set dependent on the first data set.

In an implementation of the present application, a data set associated with a second data set includes a data set on which the second data set is dependent.

In an implementation of the present application, data associated with first data includes at least one of the following: data whose data set is the same as a data set to which the first data belongs and that is dependent on the first data.

In an implementation of the present application, data associated with second data includes at least one of the following: data whose data set is the same as a data set to which the second data belongs and that is depended by the second data.

In an implementation of this application, a data set to which a data packet belongs is a data set to which data characteristic information of the data packet is mapped.

In an implementation of this application, target information of the data characteristic information includes first information corresponding to the data set to which the data characteristic information is mapped. After the target information that conforms to the data characteristic information is added to a first header of a data packet that conforms to the data characteristic information, a data set to which the data packet belongs is the data set to which the data characteristic information is mapped.

In an implementation of this application, after target information corresponding to a default data set is added to a first header of a data packet that does not conform to the data characteristic information, a data set to which the data packet that does not conform to the data characteristic information belongs is the default data set. When there are a plurality of data sets in one data tunnel, the default data set has a lowest importance level.

In an embodiment of this application, the timestamp includes at least one of the following: a decoding timestamp, a display timestamp, or a sending timestamp.

In an embodiment of this application, the data characteristic information includes at least one of the following: description information of a service, a data characteristic description, second header information corresponding to the data characteristic information, protocol information to which the data characteristic information belongs, protocol layer information to which the data characteristic information belongs, or a data association relationship.

(1) In an embodiment of this application, the service is a service flow to which data belongs. In an implementation, the description information of the service includes at least one of the following: service type information, a Fully Qualified Domain Name (FQDN), a source IP address, a target IP address, a source port, a destination port, a protocol number, a source Media Access Control (MAC) address, a target MAC address, an application identifier of the service, an operating system (OS) identifier, a packet detection rule (PDR), or a Data Network Name (DNN).

(2) In an embodiment of this application, the data characteristic description includes at least one of the following: type information of data or timestamp information. The type information of the data is, for example, type information of a data frame. The type information of the data frame includes at least one of the following: a type of the data frame is, for example, one of the following: an I frame, a P frame, a B frame, a left-eye frame, or a right-eye frame.

(3) In an implementation, second header information is a header of a second protocol of a data packet. When the second protocol is an MPEG protocol, the second header information may be a Network Abstract Layer (NAL) of the MPEG protocol.

In an implementation, whether the data is the first data may be determined by determining data characteristic information in the second header information of the data packet.

In an implementation, the data characteristic information may be obtained from the second header information. For example, an I frame may be obtained by reading an NAL header of the MPEG protocol.

(4) In an embodiment of this application, the protocol information includes at least one of the following: a name of the protocol, a version number of the protocol, or information used to identify the protocol. In an implementation, the protocol includes an MPEG protocol (for example, one of the following: H.264 or H.265).

(5) In an embodiment of this application, the protocol layer information to which the data characteristic information belongs may be a quantity of layers from a start of an outermost layer protocol of data to a protocol to which the data characteristic information belongs. For example, if a data packet structure corresponding to an I frame is an IP (TCP (MPEG)), the protocol layer information to which the data characteristic information belongs is a third layer, the protocol information to which the data characteristic information belongs is an MPEG protocol, and the second header information corresponding to the data characteristic information is an I frame. The data packet may be identified as an I frame according to the protocol layer information to which the data characteristic information belongs.

(6) In an embodiment of this application, association relationship information of data includes data description information of data B. The data B is data associated with data A indicated by the data characteristic description.

In a case that the data A is a data frame, the association relationship information of the data includes reference frame information of the data A. For example, a reference frame of a P frame is an I frame.

In an embodiment of this application, an association relationship includes at least one of the following: a dependent relationship or a depended relationship. For example, there is association relationship between a left-eye frame and a right-eye frame. There is a dependent relationship and a depended relationship between an I frame and a P frame. That is, the I frame is depended by the P frame, and the P frame is dependent on the I frame.

When the data A is dependent on the data B, it may be indicated that the data A cannot be decoded independently, and can be decoded only based on the data B.

In an embodiment of this application, preset duration is duration locally configured on a communication device.

With reference to the accompanying drawings, the following describes in detail a QoS control method and apparatus provided in the embodiments of this application by using some embodiments and application scenes thereof.

Referring to FIG. 2, an embodiment of this application provides a QoS control method. The QoS control method is applied to a first communication device. In an implementation, the first communication device may include a RAN network element such as a base station. The QoS control method includes:

Step 21: The first communication device obtains first information and/or index information used to indicate a value of the first information, where the first information includes at least one of the following: description information of a data tunnel; data description information of first data; information about a first time period; QoS configuration information; first indication information; or second indication information.

Step 22: The first communication device performs a QoS control operation on data in the data tunnel according to the first information, where the QoS configuration information includes at least one of the following: first QoS configuration information and second QoS configuration information, the second QoS configuration information, or QoS configuration adjustment information;

the first indication information is used to indicate one of the following: activating the first QoS configuration information, or deactivating the first QoS configuration information; and the second indication information is used to indicate one of the following: improving a QoS configuration of a data tunnel, or restoring a QoS configuration of a data tunnel.

In this embodiment of this application, a first communication device can activate or deactivate first QoS configuration information, or improve or restore a QoS configuration of a data tunnel by using first indication information or second indication information in first information. In addition, first data and/or a time period of a service can be identified by using data description information of the first data and/or information about a first time period in the first information, that is, identify data and/or a time period for which QoS needs to be improved, thereby resolving different QoS requirements of a same service in different time periods and improving user experience.

In an implementation, that the first communication device obtains first information and/or index information used to indicate a value of the first information may be, for example, the first communication device receives the first information and/or the index information used to indicate the value of the first information. In an implementation, the first communication device may receive the first information and/or the index information used to indicate the value of the first information from at least one of the following: a fourth communication device or a third communication device. The fourth communication device may be a core network element such as a Session Management Function (SMF), or may be a terminal. The third communication device may be a UPF or a terminal.

In an implementation, the first information is related information of a data packet in a same data tunnel.

In an implementation, the data tunnel is a QoS flow.

In an implementation, the first data is one or more data packets in the data tunnel.

In an implementation, the improving a QoS configuration of a data tunnel includes: improving a QoS level of the data tunnel. In an embodiment of this application, the improving a QoS level of the data tunnel includes at least one of the following: improving a transmission rate of the data tunnel, and improving a transmission priority of the data tunnel.

In an implementation, the restoring a QoS configuration of a data tunnel includes canceling improving the QoS configuration of the data tunnel.

In an implementation, the QoS configuration information is QoS configuration information of the data tunnel.

In an implementation, the QoS configuration information includes the first QoS configuration information and the second QoS configuration information.

In another implementation, the QoS configuration information includes the second QoS configuration information.

In another implementation, the QoS configuration information includes the second QoS configuration information and the QoS configuration adjustment information. The first communication device may first receive the second QoS configuration information (for example, when a data tunnel is established), and then subsequently receive the QoS configuration adjustment information.

In this embodiment of this application, the QoS configuration adjustment information includes one of the following: adjusted QoS configuration information, and a QoS increment adjusted based on QoS configuration information of the data tunnel.

In some embodiments, the QoS increment (for example, an adjusted QoS increment) adjusted based on the QoS configuration information of the data tunnel, for example, an adjusted downlink guaranteed bit rate is an increment of a downlink guaranteed bit rate in the existing QoS configuration information of the data tunnel. The increment may be an absolute value or a percentage.

In an implementation, the QoS configuration information of the data tunnel may be the second QoS configuration information.

In an implementation, after obtaining the first QoS configuration information, the first communication device may obtain at least one of the following according to a requirement: the first indication information and the first time period. It is not difficult to understand that the foregoing obtained information may be used to activate the first QoS configuration information.

In an implementation, after obtaining the second QoS configuration information, the first communication device may obtain at least one of the following according to a requirement: the second indication information, the first time period, and the QoS configuration adjustment information. It is not difficult to understand that the foregoing obtained information may be used to improve a QoS configuration.

In this embodiment of this application, the description information of the first data includes at least one of the following: description information of a data set to which the first data belongs, information used to identify the first data, an importance level of the first data, information about a second time period, and timestamp information, where the second time period is used to indicate that the first data is data that is in the data tunnel and whose timestamp belongs to the second time period; and the first time period is the same as or different from the second time period.

In an implementation, the first data includes at least one of the following: a data packet whose timestamp conforms to the first time period and/or the second time period, and a data packet in the data tunnel.

In some embodiments, when the first time period is different from the second time period, the data packet whose timestamp conforms to the first time period and/or the second time period identifies a data packet whose timestamp conforms to an overlapping time period between the first time period and the second time period.

In this embodiment of this application, the information about the first time period includes at least one of the following: a start time, an end time, and duration.

In this embodiment of this application, the information about the second time period includes at least one of the following: a start time, an end time, and duration.

In this embodiment of this application, the data set includes at least one of the following:

a data set corresponding to a data frame (for example, an I frame or a non-I frame; or a left-eye frame or a right-eye frame);

a data set corresponding to data frames having a dependent relationship (for example, an I frame and a non-I frame dependent on the I frame);

a data set corresponding to data frames having an association relationship (for example, a left-eye frame and a right-eye frame); and a data set corresponding to application data.

In an implementation, the data frame may include one or more data packets.

In an implementation, one of the data sets may include one or more data frames.

In an implementation, the application data may include one or more data packets, or may include one or more data frames. The application data represents that a presentation or an operation of an application can be completed only by using the data.

In this embodiment of this application, the description information of the data set includes at least one of the following:

information used to identify the data set;

importance level information of the data set;

type information of the data set;

label information of the data set; and a sequence number of the data set.

In this embodiment of this application, the information used to identify the data set includes at least one of the following:

indication information used to indicate the description information of the data set;

the importance level information of the data set;

the type information of the data set;

the label information of the data set; and the sequence number of the data set.

In an implementation, importance levels of different data sets are different, for example, a first importance level, a second importance level, . . . , and an $N^{th}$ importance level, and the importance level information of the data set may be used to identify the data set. It is not difficult to understand that importance levels of data sets to which data in a data tunnel belongs may be different. Therefore, the data may be identified by using the importance level information of the data set.

Similarly, in an implementation, if type information of different data sets is different, for example, a data set of a first type, a data set of a second type, . . . , and a data set of an $N^{th}$ type, the data set may be identified by using the type information of the data set.

In an implementation, if label information of different data sets is different, the data set may be identified by using the label information of the data set.

In an implementation, if sequence numbers of different data sets are different, the data set may be identified by using the sequence number of the data set.

In an implementation, importance level information is distinguished by using different importance level sequence numbers.

In this embodiment of this application, the data description information of the first data is used to indicate at least one of the following: requiring to improve a QoS configuration for the first data, requiring to use the first QoS configuration information for the first data, and requiring to use the QoS configuration adjustment information for the first data;

and/or the information about the first time period is used to indicate at least one of the following: improving a QoS configuration for the data tunnel within the first time period; improving a QoS configuration for the first data within the first time period; an effective time period of the first QoS configuration information; and a time period in which a first radio bearer is enabled.

In this embodiment of this application, the first QoS configuration information is used for the first data, or the first QoS configuration information is effective within the first time period, or the first QoS configuration information is invalid at a time outside the first time period;

and/or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

In this embodiment of this application, the QoS control operation includes at least one of the following:

determining the first QoS configuration information;

improving a QoS configuration for the first data;

using the first QoS configuration information for the first data;

using a first radio bearer for the first data;

improving a QoS configuration for the data tunnel;

using the QoS configuration adjustment information for the data tunnel;

using the first QoS configuration information and/or disabling the second QoS configuration information for the data tunnel, or disabling the first QoS configuration information and/or using the second QoS configuration information;

using a first radio bearer and/or disabling a second radio bearer for the data tunnel, or disabling a first radio bearer and/or using a second radio bearer;

a related operation of determining the first time period;

improving a QoS configuration for the first data within the first time period;

using the first QoS configuration information for the first data within the first time period;

using a first radio bearer for the first data within the first time period;

improving a QoS configuration for the data tunnel within the first time period;

using the first QoS configuration information and/or disabling the second QoS configuration information for the data tunnel within the first time period, or disabling the first QoS configuration information and/or using the second QoS configuration information outside the first time period; and using a first radio bearer and/or disabling a second radio bearer for the data tunnel within the first time period, or disabling a first radio bearer and/or using a second radio bearer outside the first time period.

In this embodiment of this application, the determining the first QoS configuration information includes at least one of the following: determining the first QoS configuration information according to the second QoS configuration information and the QoS configuration adjustment information; and obtaining the first QoS configuration information from the first information;

and/or the improving a QoS configuration for the first data includes: scheduling the first data according to an improved QoS configuration;

and/or the using the first QoS configuration information for the first data includes: scheduling the first data according to the first QoS configuration information;

and/or the using a first radio bearer for the first data includes: transmitting the first data by using the first radio bearer;

and/or the using a first radio bearer includes: configuring a radio resource for the first radio bearer according to the first QoS configuration information;

and/or the using the QoS configuration adjustment information for the data tunnel includes: adjusting the QoS configuration of the data tunnel according to the QoS configuration adjustment information;

and/or the using the QoS configuration adjustment information for the first data includes: adjusting a QoS configuration according to the QoS configuration adjustment information, and scheduling the first data according to an adjusted QoS configuration.

In this embodiment of this application, the related operation of determining the first time period includes at least one of the following:

starting timing upon one of the following: reception of the first information and/or the index information used to indicate the value of the first information, successful establishment of the data tunnel, and/or reception of a first data packet, where timing duration is preset duration;

starting timing upon reception of the information about the first time period, where timing duration is duration in the information about the first time period or preset duration;

starting timing according to a start time in the information about the first time period, where timing duration is duration in the information about the first time period or preset duration;

performing timing according to a start time and an end time in the information about the first time period;

determining that a start point of the first time period is a time at which the first time period is received and an end point is the start time plus duration in the information about the first time period or preset duration;

determining that a start point of the first time period is a start time in the information about the first time period and an end point is the start time plus duration in the information about the first time period or preset duration; and determining that a start point of the first time period is a start time in the information about the first time period and an end point is an end time in the information about the first time period.

In an implementation, the QoS control operation may further include a related operation for determining the second time period.

In an implementation, the related operation of determining the second time period includes at least one of the following:

starting timing upon reception of the information about the second time period, where timing duration is duration in the information about the second time period or preset duration;

starting timing according to a start time in the information about the second time period, where timing duration is duration in the information about the second time period or preset duration;

performing timing according to a start time and an end time in the information about the second time period;

determining that a start point of the second time period is a time at which the second time period is received and an end point is the start time plus duration in the information about the second time period or preset duration;

determining that a start time of the second time period is a start time in the information about the second time period and an end point is the start time plus duration in the information about the second time period or preset duration; and determining that a start point of the second time period is a start time in the information about the second time period and an end point is an end time in the information about the second time period.

In this embodiment of this application, the obtaining, by a first communication device, first information and/or index information used to indicate a value of the first information includes at least one of the following:

receiving, from control plane signaling and/or a first header of a data packet, the first information and/or the index information used to indicate the value of the first information; and obtaining the first information according to a local configuration, where the first header is a header of a first protocol.

In an implementation, the receiving the first information from control plane signaling includes receiving the description information of the first data from the control plane signaling.

In an implementation, the receiving the first information from a first header of the first data includes receiving the description information of the first data from the first header of the first data.

In an implementation, the first header of the first data is a header of a first protocol of the first data.

In some embodiments, the first protocol is an interface protocol between the first communication device and a third communication device.

In an implementation, in a case that the first communication device is a RAN network element and the third communication device is a gateway, the interface protocol between the first communication device and the third communication device may be an interface protocol between the RAN network element and the gateway, for example, an interface protocol of an NG interface user plane, namely, a GTP-U, and the header of the first protocol may be a GTP-U container.

In an implementation, in a case that the first communication device is a RAN network element and the third communication device is a terminal, the interface protocol between the first communication device and the third communication device may be an interface protocol between the RAN network element and the terminal, for example, RRC.

In this embodiment of this application, the receiving, from control plane signaling and/or a first header of a data packet, the first information and/or the index information used to indicate the value of the first information includes at least one of the following:

receiving, from the control plane signaling, the index information used to indicate the value of the first information;

receiving, from the first header of the data packet, the index information used to indicate the value of the first information;

receiving, from the first header of the data packet, information used to identify the first data, and/or receiving, from the control plane signaling, other content in the description information of the first data except the information used to identify the first data and/or other content in the first information except the description information of the first data;

receiving timestamp information of the first data from the first header of the data packet, and/or receiving, from the control plane signaling, the first time period and/or other content in the first information except the timestamp information of the first data and the first time period; and receiving, from the first header of the data packet, information used to identify the first data and/or information used to identify the first QoS configuration information.

In an implementation, the first communication device may determine the first data according to the first time period and the timestamp information of the first data.

Referring to FIG. 3, an embodiment of this application further provides a QoS control method. The QoS control method is applied to a second communication device. In an implementation, the second communication device may be one of the following: a network side device (for example, a core network element, including an application function (AF)), and a terminal. The QoS control method includes:

Step 31: The second communication device sends request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In an implementation, the first data is one or more data packets in the data tunnel.

In an implementation, the data tunnel is a QoS flow.

In an implementation, the QoS configuration information is QoS configuration information of the data tunnel.

In this embodiment of this application, the QoS configuration adjustment information includes one of the following: adjusted QoS configuration information, and a QoS increment adjusted based on QoS configuration information of the data tunnel.

In an implementation, after sending the requested first QoS configuration information, the second communication device may request at least one of the following according to a requirement: the first indication information and the first time period. It is not difficult to understand that the requested information may be used to activate the first QoS configuration information.

In an implementation, after sending the requested second QoS configuration information, the second communication device may request at least one of the following according to a requirement: the second indication information, the first time period, and the QoS configuration adjustment information. It is not difficult to understand that, the requested information may be used to temporarily improve QoS configuration information.

In this embodiment of this application, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship;

and/or the information about the first time period includes at least one of the following: a start time, an end time, and duration.

In an implementation, the second header information corresponding to the data characteristic information is used to identify the first data.

In an implementation, the protocol layer information to which the data characteristic information belongs may be a quantity of layers from a start of an outermost layer protocol of data to a protocol to which the data characteristic information belongs. For example, if a data packet structure corresponding to an I frame is an IP (TCP (MPEG)), the protocol layer information to which the data characteristic information belongs is a third layer, the protocol information to which the data characteristic information belongs is an MPEG protocol, and the second header information corresponding to the data characteristic information is an I frame. The data packet may be identified as an I frame according to the protocol layer information to which the data characteristic information belongs.

In this embodiment of this application, the data characteristic information of the first data can indicate one of the following: requiring to improve a QoS configuration for the first data, requiring to use the first QoS configuration information for the first data, and requiring to use the QoS configuration adjustment information for the first data;

and/or the first time period can indicate at least one of the following: improving a QoS configuration for the data tunnel within the first time period; improving a QoS configuration for the first data within the first time period; an effective time period of the first QoS configuration information; and a time period in which a first radio bearer is enabled.

In this embodiment of this application, the first QoS configuration information is QoS configuration information generated according to the second QoS configuration information and the QoS configuration adjustment information;

and/or the first QoS configuration information is used for the first data, or the first QoS configuration information is effective within the first time period, or the first QoS configuration information is invalid at a time outside the first time period;

and/or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

Referring to FIG. 4, an embodiment of this application further provides a QoS control method. The QoS control method is applied to a third communication device. In an implementation, the third communication device may be one of the following: a core network element (for example, a gateway, where the gateway includes a User Plane Function (UPF)), and a terminal.

The QoS control method includes:

Step 41: The third communication device receives data.

Step 42: The third communication device performs a second operation on the received data, where the second operation includes at least one of the following:

identifying that the received data is first data or is not first data;

adding, to a first header of the first data, target information that conforms to data characteristic information of the first data; and sending processed first data, where the target information includes at least one of the following: first information and index information used to indicate a value of the first information; and the first information includes at least one of the following: description information of a data tunnel; data description information of the first data; information about a first time period; QoS configuration information; first indication information that is used to indicate one of the following: activating first QoS configuration information, and deactivating the first QoS configuration information, and second indication information that is used to indicate one of the following: improving a QoS configuration of a data tunnel, and restoring a QoS configuration of a data tunnel.

In this embodiment of this application, the processed first data is first data after the target information that conforms to the data characteristic information of the first data is added to the first header of the first data. In an implementation, when the third communication device is a terminal, the terminal receives, from an application on the terminal, uplink data that needs to be sent to a network side.

In an implementation, when the third communication device is a UPF gateway, the UPF gateway receives downlink data to be sent to a terminal.

In an implementation, the sending processed first data includes: sending the processed first data to a first communication device (for example, a RAN network element).

In this embodiment of this application, the performing, by the third communication device, a second operation on the received data includes:

obtaining, by the third communication device, a first data operation rule and/or information about an effective time period of the first data operation rule; and performing, by the third communication device, the second operation on the received data according to the first data operation rule and/or the information about the effective time period of the first data operation rule, where the first data operation rule includes at least one of the following:

the data characteristic information of the first data;

the target information corresponding to the first data; and operation information used to instruct to add the target information to data that conforms to the data characteristic information of the first data.

In an implementation, the third communication device receives the first data operation rule and/or time period information from a fourth communication device (for example, an SMF). In some embodiments, the fourth communication device is an SMF.

In an implementation, it may be identified, according to the data characteristic information of the first data, that the received data is the first data or is not the first data.

In an implementation, the target information corresponding to the first data is description information of a data set to which the first data is mapped.

In this embodiment of this application, the effective time period of the first data operation rule includes at least one of the following: a start time, an end time, and duration.

In an implementation, the time period may be generated according to the effective time period of the first data operation rule.

In some embodiments, the second operation further includes a related operation of determining the effective time period of the first data operation rule.

The related operation of determining the effective time period of the first data operation rule includes at least one of the following:

- starting timing upon reception of the information about the effective time period of the first data operation rule, where timing duration is duration in the information about the effective time period of the first data operation rule or preset duration;
- starting timing according to a start time in the information about the effective time period of the first data operation rule, where timing duration is duration in the information about the effective time period of the first data operation rule or preset duration;
- performing timing according to a start time and an end time in the information about the effective time period of the first data operation rule;
- determining that a start point of the effective time period of the first data operation rule is a time at which the effective time period of the first data operation rule is received and an end point is the start time plus duration in the information about the effective time period of the first data operation rule or preset duration;
- determining that a start point of the effective time period of the first data operation rule is a start time in the information about the effective time period of the first data operation rule and an end point is the start time plus duration in the information about the effective time period of the first data operation rule or preset duration; and
- determining that a start point of the effective time period of the first data operation rule is a start time in the information about the effective time period of the first data operation rule and an end point is an end time in the information about the effective time period of the first data operation rule.

In this embodiment of this application, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

In this embodiment of this application, the first header is a header of a first protocol, and the first protocol is an interface protocol between a first communication device and the third communication device.

In an implementation, in a case that the first communication device is a RAN network element and the third communication device is a gateway, the interface protocol between the first communication device and the third communication device may be an interface protocol between the RAN network element and the gateway, for example, an interface protocol of an NG interface user plane, namely, a GTP-U, and the header of the first protocol may be a GTP-U container.

In an implementation, in a case that the first communication device is a RAN network element and the third communication device is a terminal, the interface protocol between the first communication device and the third communication device may be an interface protocol between the RAN network element and the terminal, for example, RRC.

Referring to FIG. 5, an embodiment of this application further provides a QoS control method. The QoS control method is applied to a fourth communication device. In an implementation, the fourth communication device may be a core network element, for example, an SMF.

The QoS control method includes:

Step 51: The fourth communication device performs a third operation, where the third operation includes at least one of the following:

- determining first information;
- sending a first data operation rule or sending a first data operation rule and an effective time period of the first data operation rule, and
- sending the first information and/or index information used to indicate a value of the first information, where the first information includes at least one of the following: description information of a data tunnel; data description information of first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel; and the first data operation rule includes at least one of the following:

- data characteristic information of the first data;
- target information corresponding to the first data; and
- operation information used to instruct to add the target information to data that conforms to the data characteristic information of the first data.

In an implementation, the fourth communication device (for example, an SMF) sends the first information to a first communication device (for example, a RAN). The first communication device may be a RAN device such as a base station.

In an implementation, the fourth communication device (for example, an SMF) sends the first data operation rule to a third communication device (for example, a gateway and/or a terminal). The third communication device may be a User Plane Function (UPF) or a terminal.

In this embodiment of this application, the performing, by a fourth communication device, a third operation includes: performing, by the fourth communication device, the third operation according to first policy information and/or information about an effective time period of the first policy information, where the first policy information includes at least one of the following:

- the data characteristic information of the first data;
- the target information corresponding to the first data;
- the operation information used to instruct to add the target information to data that conforms to the data characteristic information of the first data; and
- the first information corresponding to the first data, where the target information includes at least one of the following: the first information, and the index information used to indicate the value of the first information.

In an implementation, the fourth communication device receives the first policy information and/or the information about the effective time period of the first policy information from a fifth communication device. In some embodiments, the fifth communication device may be a core network element such as a Policy Control Function (PCF).

In this embodiment of this application, the effective time period of the first policy information includes at least one of the following: a start time, an end time, and duration.

In an implementation, the effective time period of the first data operation rule may be determined according to the effective time period of the first policy information.

In some embodiments, the third operation further includes a related operation of determining the effective time period of the first policy information.

The related operation of determining the effective time period of the first policy information includes at least one of the following:

starting timing upon reception of the information about the effective time period of the first policy information, where timing duration is duration in the information about the effective time period of the first policy information or preset duration;

starting timing according to a start time in the information about the effective time period of the first policy information, where timing duration is duration in the information about the effective time period of the first policy information or preset duration;

performing timing according to a start time and an end time in the information about the effective time period of the first policy information;

determining that a start point of the effective time period of the first policy information is a time at which the effective time period of the first policy information is received and an end point is the start time plus duration in the information about the effective time period of the first policy information or preset duration;

determining that a start point of the effective time period of the first policy information is a start time in the information about the effective time period of the first policy information and an end point is the start time plus duration in the information about the effective time period of the first policy information or preset duration; and determining that a start point of the effective time period of the first policy information is a start time in the information about the effective time period of the first policy information and an end point is an end time in the information about the effective time period of the first policy information.

In this embodiment of this application, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

Referring to FIG. 6, an embodiment of this application further provides a QoS control method. The QoS control method is applied to a fifth communication device. In this embodiment of this application, the fifth communication device is a core network element, for example, may be a PCF.

The QoS control method includes:

Step 61: The fifth communication device performs a fourth operation, where the fourth operation includes at least one of the following:

a related operation of determining a first time period;

determining first policy information;

determining an effective time period of the first policy information; and sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; and first information corresponding to the first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information, and the second indication information is used to indicate one of the following: improving a QoS configuration of a data tunnel, and restoring a QoS configuration of a data tunnel.

In an implementation, the fifth communication device sends the first policy information to a fourth communication device (for example, an SMF). In some embodiments, the fourth communication device may be a core network element such as an SMF.

In this embodiment of this application, the performing, by a fifth communication device, a fourth operation includes:

obtaining, by the fifth communication device, request information; and performing, by the fifth communication device, a fourth operation according to the request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In an implementation, effective time information of the first policy information may be generated according to the first time period in the request information.

In an implementation, for details of the related operation of determining the first time period, refer to the embodiment of the first communication device. Details are not described herein again.

In an implementation, the fifth communication device receives the request information from a second communication device. The second communication device may be a network side device such as an AF or a terminal. The fifth communication device may directly receive the request information from the second communication device, or indirectly receive the request information from the second communication device by using another forwarding device (for example, an NEF).

In this embodiment of this application, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

In an implementation, the first information is related information of a data packet in a same data tunnel.

In an implementation, the data tunnel is a QoS flow.

The following describes in detail the QoS control method provided in the embodiments of this application by using some specific application scenes.

Embodiment 1 of this Application

Referring to FIG. 7, the QoS control method in Embodiment 1 of this application includes:

Step 1: An AF sends AF session setup to a Network Exposure Function (NEF).

In this embodiment of this application, the AF session setup may carry request information, and the request information includes at least one of the following:

sending, by a second communication device, request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

For detailed descriptions of content in the request information, refer to the QoS control method embodiment performed by the second communication device. Details are not described herein again.

Step 2: The NEF sends the AF session setup to a PCF.

Step 3: The PCF sends a policy association modification request to an SMF.

In this embodiment of this application, the policy association modification request carries first policy information. For specific content of the first policy information, refer to the QoS control method embodiment performed by the fifth communication device. Details are not described herein again.

Step 4: The SMF sends an N4 session modification request to a UPF, and the UPF sends a feedback to the SMF.

In this embodiment of this application, the N4 session modification request carries a first data operation rule. For specific content of the first data operation rule, refer to the QoS control method embodiment performed by the fourth communication device. Details are not described herein again.

Step 5: The SMF sends an N1N2 message to an Access and Mobility Management Function (AMF).

Step 6: The AMF sends a PDU session modification request to a RAN, and the RAN performs a feedback.

Step 7: The SMF sends first information to the RAN.

In this embodiment of this application, for specific content of the first information, refer to the QoS control method embodiment performed by the first communication device. Details are not described herein again.

It should be noted that, the QoS control method provided in the embodiments of this application may be performed by a QoS control apparatus, or a control module that is in the QoS control apparatus and that is configured to perform the QoS control method. In the embodiments of this application, an example in which the QoS control apparatus performs the QoS control method is used to describe the QoS control apparatus provided in the embodiments of this application.

Referring to FIG. 8, an embodiment of this application further provides a QoS control apparatus 80, including:

an obtaining module 81, configured to obtain first information and/or index information used to indicate a value of the first information, where the first information includes at least one of the following: description information of a data tunnel; data description information of first data; information about a first time period; QoS configuration information; first indication information; and second indication information, and an execution module 82, configured to perform a QoS control operation on data in the data tunnel according to the first information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In some embodiments, the description information of the first data includes at least one of the following: description information of a data set to which the first data belongs, information used to identify the first data, an importance level of the first data, information about a second time period, and timestamp information, where the second time period is used to indicate that the first data is data that is in the data tunnel and whose timestamp belongs to the second time period; and the first time period is the same as or different from the second time period.

In some embodiments, the information about the first time period includes at least one of the following: a start time, an end time, and duration.

In some embodiments, the QoS configuration adjustment information includes one of the following: adjusted QoS configuration information, and a QoS increment adjusted based on QoS configuration information of the data tunnel.

In some embodiments, the description information of the data set includes at least one of the following:

information used to identify the data set;

importance level information of the data set;

type information of the data set;

label information of the data set; and a sequence number of the data set.

In some embodiments, the information used to identify the data set includes at least one of the following:

indication information used to indicate the description information of the data set;

the importance level information of the data set;

the type information of the data set;

the label information of the data set; and the sequence number of the data set.

In some embodiments, the information about the second time period includes at least one of the following: a start time, an end time, and duration.

In some embodiments, the data description information of the first data is used to indicate at least one of the following: requiring to improve a QoS configuration for the first data, requiring to use the first QoS configuration information for the first data, and requiring to use the QoS configuration adjustment information for the first data;

and/or the information about the first time period is used to indicate at least one of the following: improving a QoS configuration for the data tunnel within the first time period; improving a QoS configuration for the first data within the first time period; an effective time period of the first QoS configuration information; and a time period in which a first radio bearer is enabled.

In some embodiments, the first QoS configuration information is used for the first data, or the first QoS configuration information is effective within the first time period, or the first QoS configuration information is invalid at a time outside the first time period;

and/or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

In some embodiments, the QoS control operation includes at least one of the following:

determining the first QoS configuration information;

improving a QoS configuration for the first data;

using the first QoS configuration information for the first data;

using a first radio bearer for the first data;

improving a QoS configuration for the data tunnel;

using the QoS configuration adjustment information for the data tunnel;

using the first QoS configuration information and/or disabling the second QoS configuration information for the data tunnel, or disabling the first QoS configuration information and/or using the second QoS configuration information;

using a first radio bearer and/or disabling a second radio bearer for the data tunnel, or disabling a first radio bearer and/or using a second radio bearer;

a related operation of determining the first time period;

improving a QoS configuration for the first data within the first time period;

using the first QoS configuration information for the first data within the first time period;

using a first radio bearer for the first data within the first time period;

improving a QoS configuration for the data tunnel within the first time period;

using the first QoS configuration information and/or disabling the second QoS configuration information for the data tunnel within the first time period, or disabling the first QoS configuration information and/or using the second QoS configuration information outside the first time period; and using a first radio bearer and/or disabling a second radio bearer for the data tunnel within the first time period, or disabling a first radio bearer and/or using a second radio bearer outside the first time period.

In some embodiments, the determining the first QoS configuration information includes at least one of the following: determining the first QoS configuration information according to the second QoS configuration information and the QoS configuration adjustment information; and obtaining the first QoS configuration information from the first information;

and/or the improving a QoS configuration for the first data includes: scheduling the first data according to an improved QoS configuration;

and/or the using the first QoS configuration information for the first data includes: scheduling the first data according to the first QoS configuration information;

and/or the using a first radio bearer for the first data includes: transmitting the first data by using the first radio bearer;

and/or the using a first radio bearer includes: configuring a radio resource for the first radio bearer according to the first QoS configuration information;

and/or the using the QoS configuration adjustment information for the data tunnel includes: adjusting the QoS configuration of the data tunnel according to the QoS configuration adjustment information;

and/or the using the QoS configuration adjustment information for the first data includes: adjusting a QoS configuration according to the QoS configuration adjustment information, and scheduling the first data according to an adjusted QoS configuration.

In some embodiments, the related operation of determining the first time period includes at least one of the following:

starting timing upon one of the following: reception of the first information and/or the index information used to indicate the value of the first information, successful establishment of the data tunnel, and/or reception of a first data packet, where timing duration is preset duration;

starting timing upon reception of the information about the first time period, where timing duration is duration in the information about the first time period or preset duration;

starting timing according to a start time in the information about the first time period, where timing duration is duration in the information about the first time period or preset duration;

performing timing according to a start time and an end time in the information about the first time period;

determining that a start point of the first time period is a time at which the first time period is received and an end point is the start time plus duration in the information about the first time period or preset duration;

determining that a start point of the first time period is a start time in the information about the first time period and an end point is the start time plus duration in the information about the first time period or preset duration; and determining that a start point of the first time period is a start time in the information about the first time period and an end point is an end time in the information about the first time period.

In some embodiments, the obtaining, by a first communication device, first information and/or index information used to indicate a value of the first information includes at least one of the following:

receiving, from control plane signaling and/or a first header of a data packet, the first information and/or the index information used to indicate the value of the first information; and obtaining the first information according to a local configuration, where the first header is a header of a first protocol.

In some embodiments, the receiving, from control plane signaling and/or a first header of a data packet, the first information and/or the index information used to indicate the value of the first information includes at least one of the following:

receiving, from the control plane signaling, the index information used to indicate the value of the first information;

receiving, from the first header of the data packet, the index information used to indicate the value of the first information;

receiving, from the first header of the data packet, information used to identify the first data, and/or receiving, from the control plane signaling, other content in the description information of the first data except the information used to identify the first data and/or other content in the first information except the description information of the first data;

receiving timestamp information of the first data from the first header of the data packet, and/or receiving, from the control plane signaling, the first time period and/or other content in the first information except the timestamp information of the first data and the first time period, and receiving, from the first header of the data packet, information used to identify the first data and/or information used to identify the first QoS configuration information.

The QoS control apparatus provided in this embodiment of this application can implement the processes implemented in the method embodiment in FIG. 2, and achieve a same technical effect. To avoid repetition, details are not described herein again.

Figure 9:
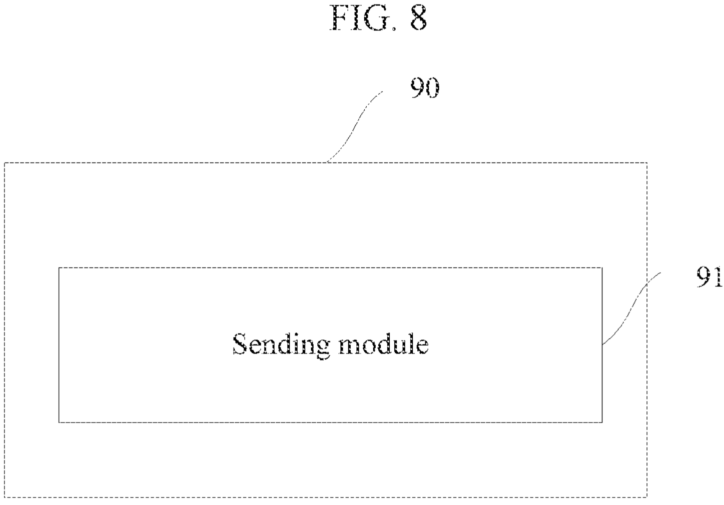
FIG. 9 is a second schematic structural diagram of a QoS control apparatus according to an embodiment of this application.

Referring to FIG. 9, an embodiment of this application further provides a QoS control apparatus 90, including:

a sending module 91, configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship;

and/or the information about the first time period includes at least one of the following: a start time, an end time, and duration.

In some embodiments, the data characteristic information of the first data can indicate one of the following: requiring to improve a QoS configuration for the first data, requiring to use the first QoS configuration information for the first data, and requiring to use the QoS configuration adjustment information for the first data;

and/or the first time period can indicate at least one of the following: improving a QoS configuration for the data tunnel within the first time period; improving a QoS configuration for the first data within the first time period; an effective time period of the first QoS configuration information; and a time period in which a first radio bearer is enabled.

In some embodiments, the first QoS configuration information is QoS configuration information generated according to the second QoS configuration information and the QoS configuration adjustment information;

and/or the first QoS configuration information is used for the first data, or the first QoS configuration information is effective within the first time period, or the first QoS configuration information is invalid at a time outside the first time period;

and/or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

The QoS control apparatus provided in this embodiment of this application can implement the processes implemented in the method embodiment in FIG. 3, and achieve a same technical effect. To avoid repetition, details are not described herein again.

Figures 10, 11:
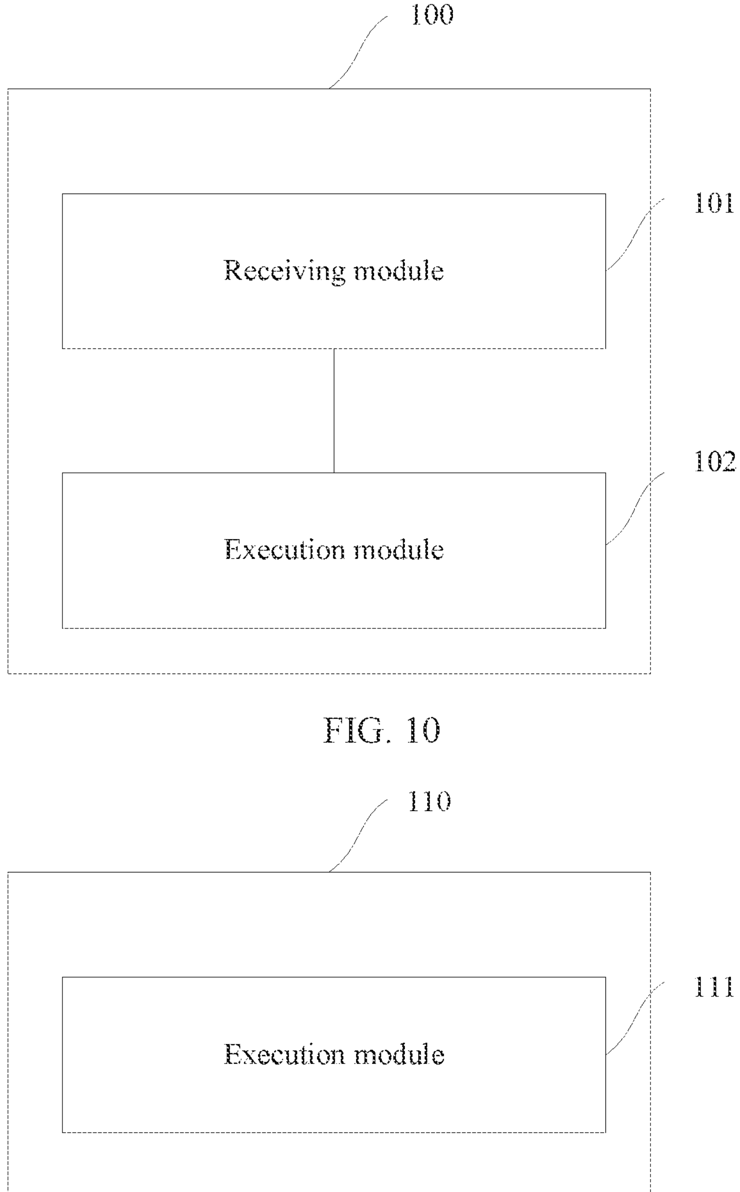
FIG. 10 is a third schematic structural diagram of a QoS control apparatus according to an embodiment of this application.
FIG. 11 is a fourth schematic structural diagram of a QoS control apparatus according to an embodiment of this application.

Referring to FIG. 10, an embodiment of this application further provides a QoS control apparatus 100, including:

a receiving module 101, configured to receive data; and an execution module 102, configured to perform a second operation on the received data, where the second operation includes at least one of the following:

identifying that the received data is first data or is not first data;

adding, to a first header of the first data, target information that conforms to data characteristic information of the first data; and sending processed first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In some embodiments, the performing, by the third communication device, a second operation on the received data includes:

obtaining, by the third communication device, a first data operation rule and/or information about an effective time period of the first data operation rule; and performing, by the third communication device, the second operation on the received data according to the first data operation rule and/or the information about the effective time period of the first data operation rule, where the first data operation rule includes at least one of the following:

the data characteristic information of the first data;

the target information corresponding to the first data; and operation information used to instruct to add the target information to data that conforms to the data characteristic information of the first data.

In some embodiments, the effective time period of the first data operation rule includes at least one of the following: a start time, an end time, and duration.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

In some embodiments, the first header is a header of a first protocol, and the first protocol is an interface protocol between a first communication device and the third communication device.

The QoS control apparatus provided in this embodiment of this application can implement the processes implemented in the method embodiment in FIG. 4, and achieve a same technical effect. To avoid repetition, details are not described herein again.

Referring to FIG. 11, an embodiment of this application further provides a QoS control apparatus 110, including:

an execution module 111, configured to perform a third operation, where the third operation includes at least one of the following:

determining first information;

sending a first data operation rule or sending a first data operation rule and an effective time period of the first data operation rule; and sending the first information and/or index information used to indicate a value of the first information, where the first information includes at least one of the following: description information of a data tunnel; data description information of first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel; and the first data operation rule includes at least one of the following:

the data characteristic information of the first data;

the target information corresponding to the first data; and operation information used to instruct to add the target information to data that conforms to the data characteristic information of the first data.

In some embodiments, the performing, by a fourth communication device, a third operation includes: performing, by the fourth communication device, the third operation according to first policy information and/or information about an effective time period of the first policy information, where the first policy information includes at least one of the following:

the data characteristic information of the first data;

the target information corresponding to the first data;

the operation information used to instruct to add the target information to data that conforms to the data characteristic information of the first data; and the first information corresponding to the first data, where the target information includes at least one of the following: the first information, and the index information used to indicate the value of the first information.

In some embodiments, the effective time period of the first policy information includes at least one of the following: a start time, an end time, and duration.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

The QoS control apparatus provided in this embodiment of this application can implement the processes implemented in the method embodiment in FIG. 5, and achieve a same technical effect. To avoid repetition, details are not described herein again.

Figures 12, 13:
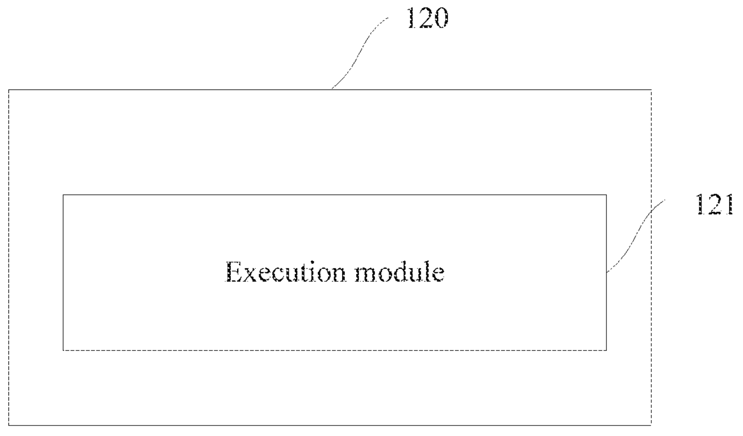
FIG. 12 is a fifth schematic structural diagram of a QoS control apparatus according to an embodiment of this application.
FIG. 13 is a schematic structural diagram of a communication device according to an embodiment of this application.

Referring to FIG. 12, an embodiment of this application further provides a QoS control apparatus 120, including:

an execution module 121, configured to perform a fourth operation, where the fourth operation includes at least one of the following:

a related operation of determining a first time period;

determining first policy information;

determining an effective time period of the first policy information; and sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; and first information corresponding to the first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information, and the second indication information is used to indicate one of the following: improving a QoS configuration of a data tunnel, and restoring a QoS configuration of a data tunnel.

In some embodiments, the performing, by a fifth communication device, a fourth operation includes:

obtaining, by the fifth communication device, request information; and performing, by the fifth communication device, a fourth operation according to the request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship.

The QoS control apparatus provided in this embodiment of this application can implement the processes implemented in the method embodiment in FIG. 6, and achieve a same technical effect. To avoid repetition, details are not described herein again.

As shown in FIG. 13, an embodiment of this application further provides a communication device 130, including a processor 131, a memory 132, and a program or an instruction that is stored in the memory 132 and that can be run on the processor 131, where the program or the instruction is executed by the processor 131 to implement the processes of the foregoing QoS control method embodiment, and a same technical effect can be achieved. To avoid repetition, details are not described herein again.

An embodiment of this application further provides a terminal, including a processor and a communication interface, where the communication interface is configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

Figure 14:
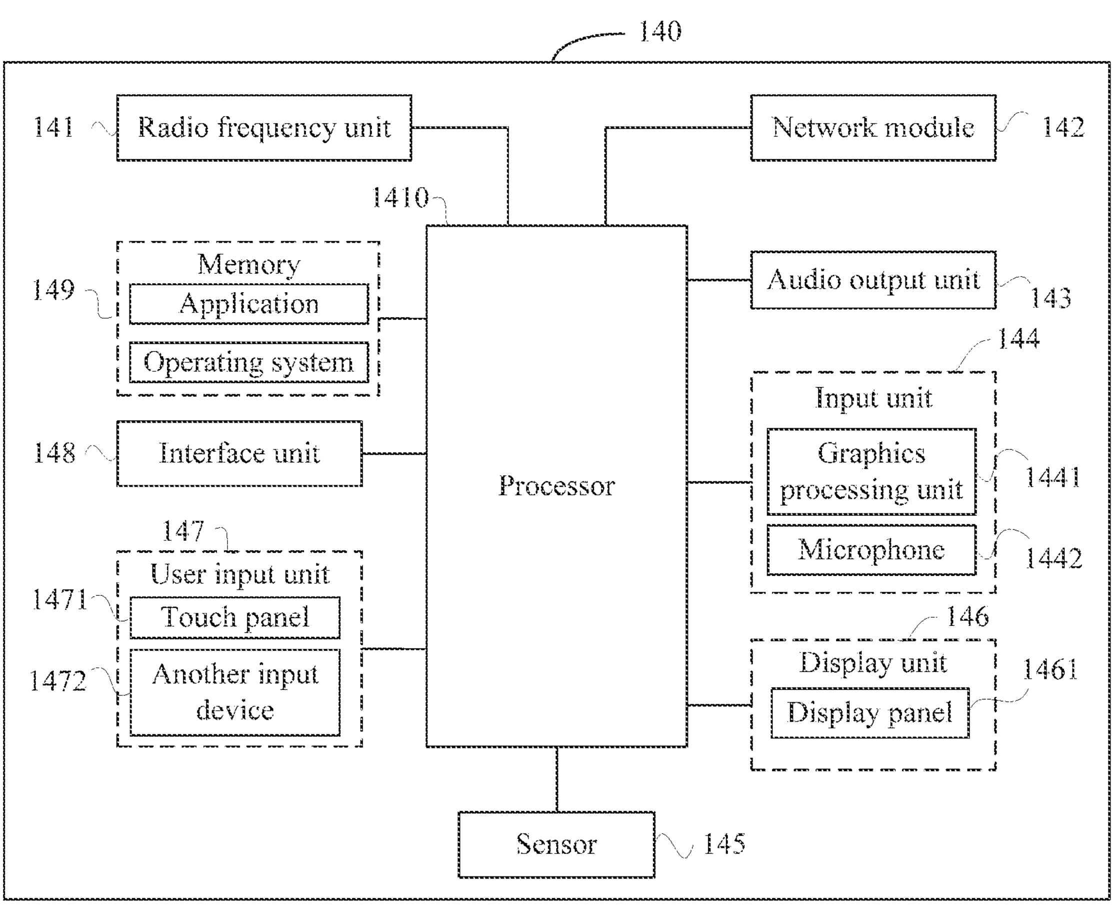
FIG. 14 is a schematic structural diagram of hardware of a terminal according to an embodiment of this application.

This terminal embodiment corresponds to the foregoing method embodiment on the terminal side. Each implementation process and implementation of the foregoing method embodiment may be applicable to this terminal embodiment, and a same technical effect can be achieved. FIG. 14 is a schematic structural diagram of hardware of a terminal according to an embodiment of this application.

The terminal 140 includes but is not limited to at least a part of components such as a radio frequency unit 141, a network module 142, an audio output unit 143, an input unit 144, a sensor 145, a display unit 146, a user input unit 147, an interface unit 148, a memory 149, and a processor 1410.

A person skilled in the art can understand that the terminal 140 may further include a power supply (for example, a battery) that supplies power to each component. The power supply may be logically connected to the processor 1410 by using a power supply management system, to implement functions such as charging and discharging management, and power consumption management by using the power supply management system. The terminal structure shown in FIG. 14 constitutes no limitation on the terminal, and the terminal may include more or fewer components than those shown in the figure, or combine some components, or have different component arrangements. Details are not described herein.

It should be understood that, in this embodiment of this application, the input unit 144 may include a Graphics Processing Unit (GPU) 1441 and a microphone 1442, and the graphics processing unit 1441 processes image data of a still picture or a video obtained by an image capture apparatus (for example, a camera) in a video capture mode or an image capture mode. The display unit 146 may include a display panel 1461. In some embodiments, the display panel 1461 may be configured in a form such as a liquid crystal display or an organic light-emitting diode. The user input unit 147 includes a touch panel 1471 and another input device 1472. The touch panel 1471 is also referred to as a touchscreen. The touch panel 1471 may include two parts: a touch detection apparatus and a touch controller. The another input device 1472 may include but is not limited to a physical keyboard, a functional button (for example, a volume control button or a power on/off button), a trackball, a mouse, and a joystick. Details are not described herein.

In this embodiment of this application, the radio frequency unit 141 receives downlink data from a network side device and then sends the downlink data to the processor 1410 for processing; and sends uplink data to the network side device. Usually, the radio frequency unit 141 includes but is not limited to an antenna, at least one amplifier, a transceiver, a coupler, a low noise amplifier, a duplexer, and the like.

The memory 149 may be configured to store a software program or an instruction and various data. The memory 149 may mainly include a program or instruction storage area and a data storage area. The program or instruction storage area may store an operating system, and an application or an instruction required by at least one function (for example, a sound playing function or an image playing function). In addition, the memory 149 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 1410 may include one or more processing units. In some embodiments, an application processor and a modem processor may be integrated into the processor 1410. The application processor mainly processes an operating system, a user interface, an application, an instruction, or the like. The modem processor mainly processes wireless communication, for example, a baseband processor. It can be understood that the modem processor may not be integrated into the processor 1410.

The radio frequency unit 141 is configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and a data association relationship;

and/or the information about the first time period includes at least one of the following: a start time, an end time, and duration.

In some embodiments, the data characteristic information of the first data can indicate one of the following: requiring to improve a QoS configuration for the first data, requiring to use the first QoS configuration information for the first data, and requiring to use the QoS configuration adjustment information for the first data;

and/or the first time period can indicate at least one of the following: improving a QoS configuration for the data tunnel within the first time period; improving a QoS configuration for the first data within the first time period; an effective time period of the first QoS configuration information; and a time period in which a first radio bearer is enabled.

In some embodiments, the first QoS configuration information is QoS configuration information generated according to the second QoS configuration information and the QoS configuration adjustment information;

and/or the first QoS configuration information is used for the first data, or the first QoS configuration information is effective within the first time period, or the first QoS configuration information is invalid at a time outside the first time period;

and/or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

An embodiment of this application further provides a network side device, including a processor and a communication interface, where the processor is configured to:

obtain first information and/or index information used to indicate a value of the first information, where the first information includes at least one of the following: description information of a data tunnel; data description information of first data; information about a first time period; QoS configuration information; first indication information; and second indication information; and perform a QoS control operation on data in the data tunnel according to the first information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

The network side device embodiment corresponds to the foregoing QoS control method embodiment performed by the first communication device. Each implementation process and implementation of the foregoing method embodiment may be applicable to this network side device embodiment, and a same technical effect can be achieved.

An embodiment of this application further provides a network side device, including a processor and a communication interface, where the communication interface is configured to send request information, where the request information includes at least one of the following:

data characteristic information of first data;

information about a first time period;

requested QoS configuration information;

first indication information; and second indication information, where the QoS configuration information includes at least one of the following: first QoS configuration information and second QoS configuration information the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

The network side device embodiment corresponds to the foregoing QoS control method embodiment performed by the second communication device. Each implementation process and implementation of the foregoing method embodiment may be applicable to this network side device embodiment, and a same technical effect can be achieved.

An embodiment of this application further provides a network side device, including a processor and a communication interface, where the communication interface is configured to receive data; and the processor is configured to perform a second operation on the received data, where the second operation includes at least one of the following:

identifying that the received data is first data or is not first data;

adding, to a first header of the first data, target information that conforms to data characteristic information of the first data; and sending processed first data, where the target information includes at least one of the following: first information and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel.

The network side device embodiment corresponds to the foregoing QoS control method embodiment performed by the third communication device. Each implementation process and implementation of the foregoing method embodiment may be applicable to this network side device embodiment, and a same technical effect can be achieved.

An embodiment of this application further provides a network side device, including a processor and a communication interface, where the processor is configured to perform a third operation, where the third operation includes at least one of the following:

determining first information;

sending a first data operation rule or sending a first data operation rule and an effective time period of the first data operation rule; and sending the first information and/or index information used to indicate a value of the first information, where the first information includes at least one of the following: description information of a data tunnel; data description information of first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information; and the second indication information is used to indicate one of the following: improving a QoS configuration of a data tunnel, and restoring a QoS configuration of a data tunnel; and the first data operation rule includes at least one of the following:

data characteristic information of the first data;

target information corresponding to the first data; and operation information used to instruct to add the target information to data that conforms to the data characteristic information of the first data.

The network side device embodiment corresponds to the foregoing QoS control method embodiment performed by the fourth communication device. Each implementation process and implementation of the foregoing method embodiment may be applicable to this network side device embodiment, and a same technical effect can be achieved.

An embodiment of this application further provides a network side device, including a processor and a communication interface, where the processor is configured to perform a fourth operation, where the fourth operation includes at least one of the following: a related operation of determining a first time period; determining first policy information;

determining an effective time period of the first policy information; and sending the first policy information or sending the first policy information and the effective time period of the first policy information, where the first policy information includes at least one of the following:

data characteristic information of first data;

target information corresponding to the first data;

operation information used to instruct to add the target information to data that conforms to the data characteristic information of the first data; and first information corresponding to the first data, where the target information includes at least one of the following: the first information, and index information used to indicate a value of the first information; and the first information includes at least one of the following: description information of a data tunnel; data description information of the first data; information about a first time period; QoS configuration information; first indication information; and second indication information, where the QoS configuration information includes at least one of the following: first QoS configuration information and second QoS configuration information, the second QoS configuration information, and QoS configuration adjustment information; the first indication information is used to indicate one of the following: activating the first QoS configuration information, and deactivating the first QoS configuration information, and the second indication information is used to indicate one of the following: improving a QoS configuration of a data tunnel, and restoring a QoS configuration of a data tunnel.

The network side device embodiment corresponds to the foregoing QoS control method embodiment performed by the fifth communication device. Each implementation process and implementation of the foregoing method embodiment may be applicable to this network side device embodiment, and a same technical effect can be achieved.

Figure 15:
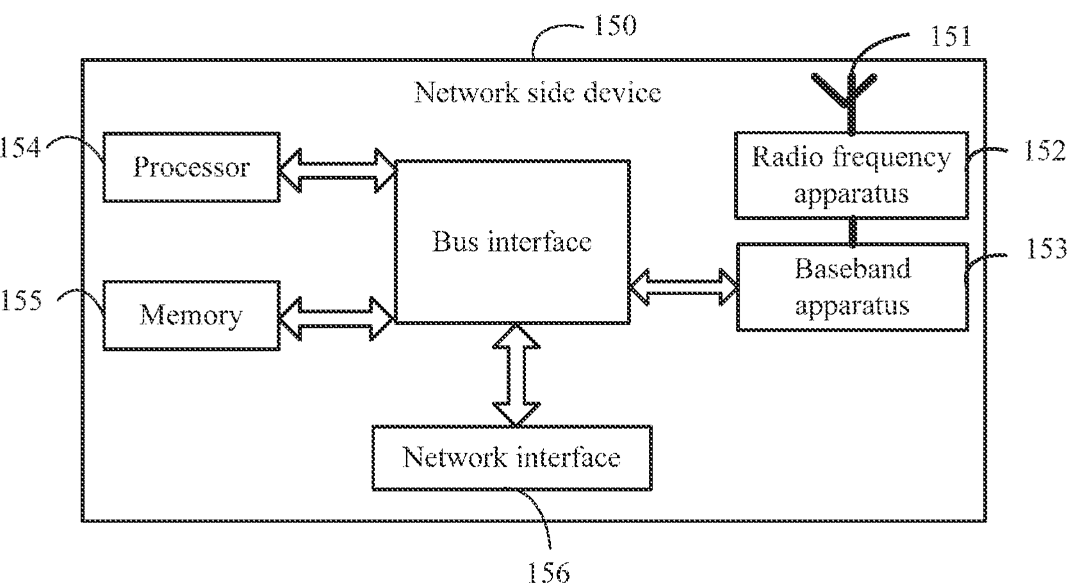
FIG. 15 is a schematic structural diagram of hardware of a network side device according to an embodiment of this application.

An embodiment of this application further provides a network side device. As shown in FIG. 15, a network device 1500 includes an antenna 151, a radio frequency apparatus 152, and a baseband apparatus 153. The antenna 151 is connected to the radio frequency apparatus 152. In an uplink direction, the radio frequency apparatus 152 receives information by using the antenna 151, and sends the received information to the baseband apparatus 153 for processing. In a downlink direction, the baseband apparatus 153 processes information that needs to be sent, and sends processed information to the radio frequency apparatus 152. The radio frequency apparatus 152 processes the received information, and sends processed information by using the antenna 151.

The frequency band processing apparatus may be located in the baseband apparatus 153. The method performed by the network side device in the foregoing embodiment may be implemented in the baseband apparatus 153. The baseband apparatus 153 includes a processor 154 and a memory 155.

The baseband apparatus 153 may include, for example, at least one baseband board, where a plurality of chips are disposed on the baseband board. As shown in FIG. 15, one chip is, for example, the processor 154, which is connected to the memory 155, so as to invoke a program in the memory 155 to perform operations of the network device shown in the foregoing method embodiment.

The baseband apparatus 153 may further include a network interface 156, configured to exchange information with the radio frequency apparatus 152. For example, the interface is a common public radio interface (CPRI).

The network side device in this embodiment of the present application further includes an instruction or a program that is stored in the memory 155 and that can be run on the processor 154. The processor 154 invokes the instruction or the program in the memory 155 to perform the method performed by the modules shown in FIG. 8, and a same technical effect is achieved. To avoid repetition, details are not described herein again.

An embodiment of this application further provides a readable storage medium. The readable storage medium may be non-volatile or volatile. The readable storage medium stores a program or an instruction, and the program or the instruction is executed by a processor to implement the processes of the foregoing QoS control method embodiment, and a same technical effect can be achieved. To avoid repetition, details are not described herein again.

The processor is a processor in the terminal in the foregoing embodiment. The readable storage medium includes a computer-readable storage medium, such as a computer ROM, a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing QoS control method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (for example, a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for quality of service (QoS) control, comprising:

obtaining, by a first communication device, first information or index information used to indicate a value of the first information, wherein the first information comprises first QoS configuration information and second QoS configuration information; or QoS configuration adjustment information; or second indication information; and performing, by the first communication device, a QoS control operation on data in a data tunnel according to the first information, wherein:

the first QoS configuration information and the second QoS configuration information are two groups of QoS configuration information corresponding to one QoS flow;

the QoS configuration adjustment information comprises one of the following: adjusted QoS configuration information, or a QoS increment adjusted based on QoS configuration information of the data tunnel; and the second indication information is used to indicate one of the following: improving a QoS configuration of the data tunnel, or restoring a QoS configuration of the data tunnel, when the first information comprises the first QoS configuration information and the second QoS configuration information, the performing, by the first communication device, the QoS control operation on data in the data tunnel according to the first information comprises: activating the first QoS configuration information or deactivating the second QoS configuration information; and after activating the first QoS configuration information or deactivating the second QoS configuration information, deactivating the first QoS configuration information or activating the second QoS configuration information;

when the first information comprises the QoS configuration adjustment information, the performing, by the first communication device, the QoS control operation on data in the data tunnel according to the first information comprises: using the QoS configuration adjustment information for the data tunnel; and when the first information comprises the second indication information, the performing, by the first communication device, the QoS control operation on data in the data tunnel according to the first information comprises: improving a QoS configuration of the data tunnel, or restoring a QoS configuration of the data tunnel, wherein the first communication device is a Radio Access Network (RAN) network element.

2. The method according to claim 1, wherein the first information further comprises at least one of the following: description information of the data tunnel; data description information of first data; or information about a first time period, wherein the description information of the first data comprises at least one of the following: description information of a data set to which the first data belongs, information used to identify the first data, an importance level of the first data, information about a second time period, or timestamp information, wherein the second time period is used to indicate that the first data is data that is in the data tunnel and whose timestamp belongs to the second time period; and the first time period is the same as or different from the second time period.

3. The method according to claim 2, wherein the information about the first time period comprises at least one of the following: a start time, an end time, or duration.

4. The method according to claim 2, wherein the description information of the data set comprises at least one of the following:

information used to identify the data set;

importance level information of the data set;

type information of the data set;

label information of the data set; or a sequence number of the data set.

5. The method according to claim 4, wherein the information used to identify the data set comprises at least one of the following:

indication information used to indicate the description information of the data set;

the importance level information of the data set;

the type information of the data set;

the label information of the data set; or the sequence number of the data set.

6. The method according to claim 2, wherein the data description information of the first data is used to indicate at least one of the following: requiring to improve a QoS configuration for the first data, requiring to use the first QoS configuration information for the first data, or requiring to use the QoS configuration adjustment information for the first data; or the information about the first time period is used to indicate at least one of the following: improving a QoS configuration for the data tunnel within the first time period; improving a QoS configuration for the first data within the first time period; an effective time period of the first QoS configuration information; or a time period in which a first radio bearer is enabled.

7. The method according to claim 2, wherein the first QoS configuration information is used for the first data, or the first QoS configuration information is effective within the first time period, or the first QoS configuration information is invalid at a time outside the first time period; or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

8. The method according to claim 2, wherein the QoS control operation comprises at least one of the following:
determining the first QoS configuration information;
improving a QoS configuration for the first data;
using the first QoS configuration information for the first data;
using a first radio bearer for the first data;
improving a QoS configuration for the data tunnel;
using the QoS configuration adjustment information for the data tunnel;
using the first QoS configuration information or disabling the second QoS configuration information for the data tunnel, or disabling the first QoS configuration information or using the second QoS configuration information;
using a first radio bearer or disabling a second radio bearer for the data tunnel, or disabling a first radio bearer or using a second radio bearer;
a related operation of determining the first time period;
improving a QoS configuration for the first data within the first time period;
using the first QoS configuration information for the first data within the first time period;
using a first radio bearer for the first data within the first time period;
improving a QoS configuration for the data tunnel within the first time period;
using the first QoS configuration information or disabling the second QoS configuration information for the data tunnel within the first time period, or disabling the first QoS configuration information or using the second QoS configuration information outside the first time period; or
using a first radio bearer or disabling a second radio bearer for the data tunnel within the first time period, or disabling a first radio bearer or using a second radio bearer outside the first time period.

9. The method according to claim 8, wherein the determining the first QoS configuration information comprises at least one of the following: determining the first QoS configuration information according to the second QoS configuration information and the QoS configuration adjustment information; or obtaining the first QoS configuration information from the first information;
the improving a QoS configuration for the first data comprises: scheduling the first data according to an improved QoS configuration;
the using the first QoS configuration information for the first data comprises: scheduling the first data according to the first QoS configuration information;
the using a first radio bearer for the first data comprises: transmitting the first data by using the first radio bearer;
the using a first radio bearer comprises: configuring a radio resource for the first radio bearer according to the first QoS configuration information;
the using the QoS configuration adjustment information for the data tunnel comprises: adjusting the QoS configuration of the data tunnel according to the QoS configuration adjustment information; or
the using the QoS configuration adjustment information for the first data comprises: adjusting a QoS configuration according to the QoS configuration adjustment information, and scheduling the first data according to an adjusted QoS configuration.

10. The method according to claim 8, wherein the related operation of determining the first time period comprises at least one of the following:
starting timing upon one of the following: reception of the first information or the index information used to indicate the value of the first information, successful establishment of the data tunnel, or reception of a first data packet, wherein timing duration is preset duration;
starting timing upon reception of the information about the first time period, wherein timing duration is duration in the information about the first time period or preset duration;
starting timing according to a start time in the information about the first time period, wherein timing duration is duration in the information about the first time period or preset duration;
performing timing according to a start time and an end time in the information about the first time period;
determining that a start point of the first time period is a time at which the first time period is received and an end point is the start time plus duration in the information about the first time period or preset duration;
determining that a start point of the first time period is a start time in the information about the first time period and an end point is the start time plus duration in the information about the first time period or preset duration; or
determining that a start point of the first time period is a start time in the information about the first time period and an end point is an end time in the information about the first time period.

11. The method according to claim 1, wherein the obtaining, by a first communication device, first information or index information used to indicate a value of the first information comprises at least one of the following:
receiving, from control plane signaling or a first header of a data packet, the first information or the index information used to indicate the value of the first information; or
obtaining the first information according to a local configuration.

12. The method according to claim 11, wherein the receiving, from control plane signaling or a first header of a data packet, the first information or the index information used to indicate the value of the first information comprises at least one of the following:
receiving, from the control plane signaling, the index information used to indicate the value of the first information;
receiving, from the first header of the data packet, the index information used to indicate the value of the first information;
receiving, from the first header of the data packet, information used to identify the first data, or receiving, from the control plane signaling, other content in description information of the first data except the information used to identify the first data or other content in the first information except the description information of the first data;
receiving timestamp information of the first data from the first header of the data packet, or receiving, from the control plane signaling, a first time period or other content in the first information except the timestamp information of the first data and the first time period; or
receiving, from the first header of the data packet, information used to identify the first data or information used to identify the first QoS configuration information.

13. The method according to claim 1, wherein, the data tunnel include one of the following: a Protocol Data Unit (PDU) session, a PDN connection, a QoS flow, a bearer, or an Internet Protocol security (IPsec) tunnel.

14. A method for QoS control, comprising:

sending, by a second communication device, request information, wherein the request information comprises at least one of the following:

first QoS configuration information and second QoS configuration information;

QoS configuration adjustment information; or second indication information, wherein:

the first QoS configuration information and the second QoS configuration information are two groups of QoS configuration information corresponding to one QoS flow;

the QoS configuration adjustment information comprises one of the following: adjusted QoS configuration information, or a QoS increment adjusted based on QoS configuration information of a data tunnel; and the second indication information is used to indicate one of the following: improving a QoS configuration of the data tunnel, or restoring a QoS configuration of the data tunnel.

15. The method according to claim 14, wherein the request information further comprises at least one of the following: data characteristic information of first data; or information about a first time period, wherein the data characteristic information comprises at least one of the following: description information of a service, a data characteristic description, second header information corresponding to the data characteristic information, protocol information to which the data characteristic information belongs, protocol layer information to which the data characteristic information belongs, or a data association relationship; or the information about the first time period comprises at least one of the following: a start time, an end time, or duration.

16. The method according to claim 15, wherein the data characteristic information of the first data indicates one of the following: requiring to improve a QoS configuration for the first data, requiring to use the first QoS configuration information for the first data, or requiring to use the QoS configuration adjustment information for the first data; or the first time period indicates at least one of the following: improving a QoS configuration for the data tunnel within the first time period; improving a QoS configuration for the first data within the first time period; an effective time period of the first QoS configuration information; or a time period in which a first radio bearer is enabled.

17. The method according to claim 15, wherein the first QoS configuration information is QoS configuration information generated according to the second QoS configuration information and the QoS configuration adjustment information;

the first QoS configuration information is used for the first data, or the first QoS configuration information is effective within the first time period, or the first QoS configuration information is invalid at a time outside the first time period; or the second QoS configuration information is used for the data tunnel, or the second QoS configuration information is used for other data in the data tunnel except the first data, or the second QoS configuration information is effective at a time outside the first time period, or the second QoS configuration information is invalid within the first time period.

18. A method for quality of service (QoS) control, comprising:

receiving, by a third communication device, data; and performing, by the third communication device, a second operation on the received data, wherein the second operation comprises at least one of the following:

identifying that the received data is first data or is not first data;

adding, to a first header of the first data, target information that conforms to data characteristic information of the first data; or sending processed first data, wherein the target information comprises at least one of the following: first information or index information used to indicate a value of the first information; and the first information comprises at least one of the following: first QoS configuration information and second QoS configuration information; or QoS configuration adjustment information; or second indication information, wherein the first QoS configuration information and the second QoS configuration information are two groups of QoS configuration information corresponding to one QoS flow;

the QoS configuration adjustment information comprises one of the following: adjusted QoS configuration information, or a QoS increment adjusted based on QoS configuration information of a data tunnel; and the second indication information is used to indicate one of the following: improving a QoS configuration of the data tunnel, or restoring a QoS configuration of the data tunnel.

19. The method according to claim 18, wherein the performing, by the third communication device, a second operation on the received data comprises:

obtaining, by the third communication device, a first data operation rule or information about an effective time period of the first data operation rule; and performing, by the third communication device, the second operation on the received data according to the first data operation rule or the information about the effective time period of the first data operation rule, wherein the first data operation rule comprises at least one of the following:

the data characteristic information of the first data;

the target information corresponding to the first data; or operation information used to instruct to add the target information to data that conforms to the data characteristic information of the first data.

20. The method according to claim 18, wherein the first information further comprises at least one of the following: data description information of the first data; or information about a first time period.

* * * * *